United States Patent
Nomura

(10) Patent No.: US 6,751,609 B2
(45) Date of Patent: Jun. 15, 2004

(54) MAP DATABASE APPARATUS

(75) Inventor: Takashi Nomura, Chigasaki (JP)

(73) Assignee: Xanavi Informatics Corporation, Kanagawa (JP)

( * ) Notice: Subject to any disclaimer, the term of this patent is extended or adjusted under 35 U.S.C. 154(b) by 0 days.

(21) Appl. No.: 10/134,457

(22) Filed: Apr. 30, 2002

(65) Prior Publication Data

US 2002/0129020 A1 Sep. 12, 2002

Related U.S. Application Data

(63) Continuation of application No. 08/989,240, filed on Dec. 12, 1997.

(30) Foreign Application Priority Data

Dec. 12, 1996 (JP) ............................................. 8-332562

(51) Int. Cl.$^7$ ............................................. G06F 17/30
(52) U.S. Cl. ......................... 707/3; 707/102; 701/200; 701/201; 701/211
(58) Field of Search ............................... 707/10, 1, 3, 6, 707/102, 205, 201; 701/1, 200, 210, 211

(56) References Cited

U.S. PATENT DOCUMENTS

| | | | | |
|---|---|---|---|---|
| 4,878,170 A | * | 10/1989 | Zeevi | 364/449 |
| 5,214,757 A | * | 5/1993 | Mauney et al. | 395/161 |
| 5,392,428 A | * | 2/1995 | Robins | 395/600 |
| 5,410,485 A | | 4/1995 | Ichikawa | |
| 5,412,573 A | * | 5/1995 | Barnea et al. | 701/211 |
| 5,523,765 A | | 6/1996 | Ichikawa | |
| 5,874,905 A | * | 2/1999 | Nanba et al. | 340/995 |
| 5,884,218 A | * | 3/1999 | Nimura et al. | 701/208 |
| 5,922,042 A | * | 7/1999 | Sekine et al. | 701/210 |
| 5,925,090 A | * | 7/1999 | Poonsaengsathit | 701/211 |
| 5,974,357 A | * | 10/1999 | Poonsaengsathit et al. | 701/210 |

FOREIGN PATENT DOCUMENTS

| | | |
|---|---|---|
| EP | 0 702 208 | 3/1996 |
| EP | 0 738 981 | 10/1996 |
| JP | 6-318298 | 11/1994 |
| JP | 7-103772 | 4/1995 |
| JP | 7-103773 | 4/1995 |
| JP | 8-292716 | 11/1996 |

OTHER PUBLICATIONS

*Proceedings of the Vehicle Navigation and Information Systems Conference,* Sep. 11–13, 1989 entitled "Digital Road Map Data Base for Vehicle Navigation and Road Information Systems" by S. Kamijo et al. pp. 319–323.

* cited by examiner

*Primary Examiner*—Jean M. Corrielus
(74) *Attorney, Agent, or Firm*—Crowell & Moring LLP

(57) ABSTRACT

A map database apparatus according to the present invention manages roads by expressing the roads as link strings. Each of the link strings is constituted by connecting a plurality of links, each of the links has nodes at a front end and a rear end respectively, the map database apparatus has node information concerning the nodes, and the node information includes guide data to be used for route guidance. And, the guide data have directional characteristics corresponding to an order in which the links are connected.

2 Claims, 50 Drawing Sheets

LINK STRING 2 DATA

NODE NO2:
- ATTRIBUTE 1 | POSITIONAL COORDINATE X 6
- ATTRIBUTE 2 | POSITIONAL COORDINATE Y 6
- IDENTICAL NODE OFFSET
- GUIDE OFFSET
- LINK NUMBER

GUIDE DATA AT NODE NO2
- INTERSECTION NAME HEADER
- INTERSECTION NAME OFFSET
- ROAD NAME HEADER
- ROAD NAME OFFSET
- COURSE SIGN HEADER
- COURSE SIGN OFFSET
- EXPANSION DATA (LANDMARK) HEADER
- EXPANSION DATA (LANDMARK) OFFSET

INTERSECTION NAME TABLE

| A A A A A A A |
|---|
| B B B |
| A B C |
| C C |
| D D D |

FIG. 4

| | ITEM | NAME |
|---|---|---|
| LINK STRING 1 | LINK STRING INFORMATION | LINK STRING SIZE |
| | | NUMBER OF ELEMENT POINTS |
| | | LINK ATTRIBUTE |
| | | ROAD NAME OFFSET |
| | | ROAD NUMBER |
| | | |
| | NODE LINK INFORMATION | ATTRIBUTE 1 + X COORDINATE |
| | | ATTRIBUTE 2 + Y COORDINATE |
| | | IDENTICAL NODE OFFSET |
| | | GUIDE OFFSET |
| | | LINK NUMBER |
| | | ⋮ |
| | | ATTRIBUTE 1 + X COORDINATE |
| | | ATTRIBUTE 2 + Y COORDINATE |
| | | IDENTICAL NODE OFFSET |
| | | GUIDE OFFSET |
| | | LINK NUMBER |
| | | ALTITUDE INFORMATION |
| | | ⋮ |
| | | ALTITUDE INFORMATION |
| ⋮ | ⋮ | ⋮ |
| LINK STRING n | LINK STRING INFORMATION | |
| | NODE LINK INFORMATION | |

FIG. 8A

LINK STRING 2 DATA

NODE NO2 {
- ATTRIBUTE 1 : POSITIONAL COORDINATE X 6
- ATTRIBUTE 2 : POSITIONAL COORDINATE Y 6
- IDENTICAL NODE OFFSET
- GUIDE OFFSET
- LINK NUMBER
}

FIG. 8B

GUIDE DATA AT NODE NO2

- INTERSECTION NAME HEADER
- INTERSECTION NAME OFFSET
- ROAD NAME HEADER
- ROAD NAME OFFSET
- COURSE SIGN HEADER
- COURSE SIGN OFFSET
- EXPANSION DATA (LANDMARK) HEADER
- EXPANSION DATA (LANDMARK) OFFSET
- ...

FIG. 8C

INTERSECTION NAME TABLE

A A A A A A A
B B B
A B C
C C
D D D
...

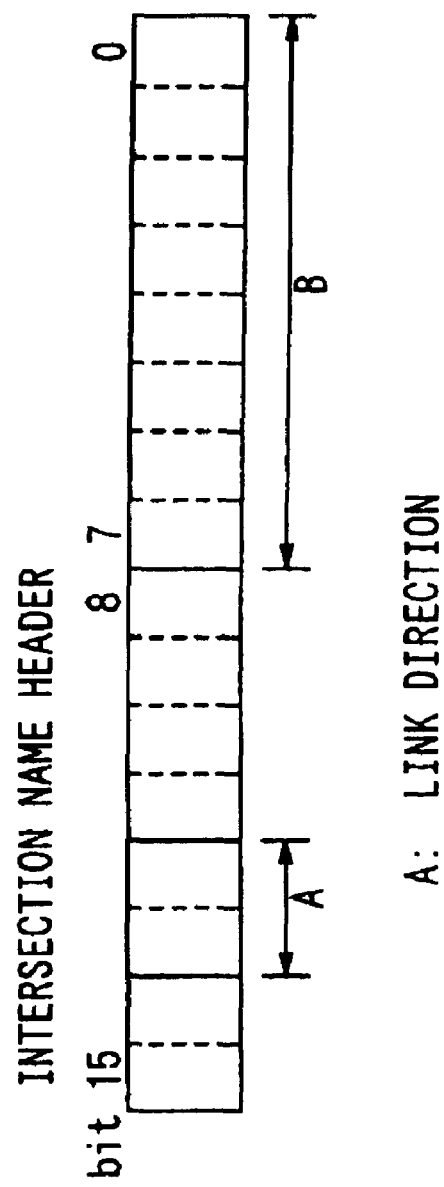

FIG. 9B

| ITEM NUMBER | BIT | DETAILS | | | |
|---|---|---|---|---|---|
| 1 | 15-14 | (RESERVED) | | | |
| 2 | 13-12 | LINK DIRECTION | bit 13 | bit 12 | MEANING |
| | | | 0 | 0 | ALL DIRECTIONS (SAME NAME IN ALL DIRECTIONS OF APPROACH) |
| | | | 0 | 1 | FORWARD DIRECTION (MATCHING THE ORDER IN WHICH LINK STRINGS ARE STORED) |
| | | | 1 | 0 | REVERSE DIRECTION (REVERSE OF THE ORDER IN WHICH LINK STRINGS ARE STORED) |
| | | | 1 | 1 | BIDIRECTIONAL (NO DIRECTIONALITY) |
| 3 | 11-8 | (REVERSED) | | | |
| 4 | 7-0 | NUMBER OF CHARACTERS IN CHARACTER STRING | | | |

FORWARD DIRECTION, REVERSE DIRECTION, BIDIRECTIONAL

⟵ : LINK STRING
FORWARD DIRECTION

BIDIRECTIONAL AT INTERSECTION "A" IN LINK STRING 1
FORWARD DIRECTION AT INTERSECTION "A" IN LINK STRING 2
REVERSE DIRECTION AT INTERSECTION "B" IN LINK STRING 2

STATE AT INTERSECTION

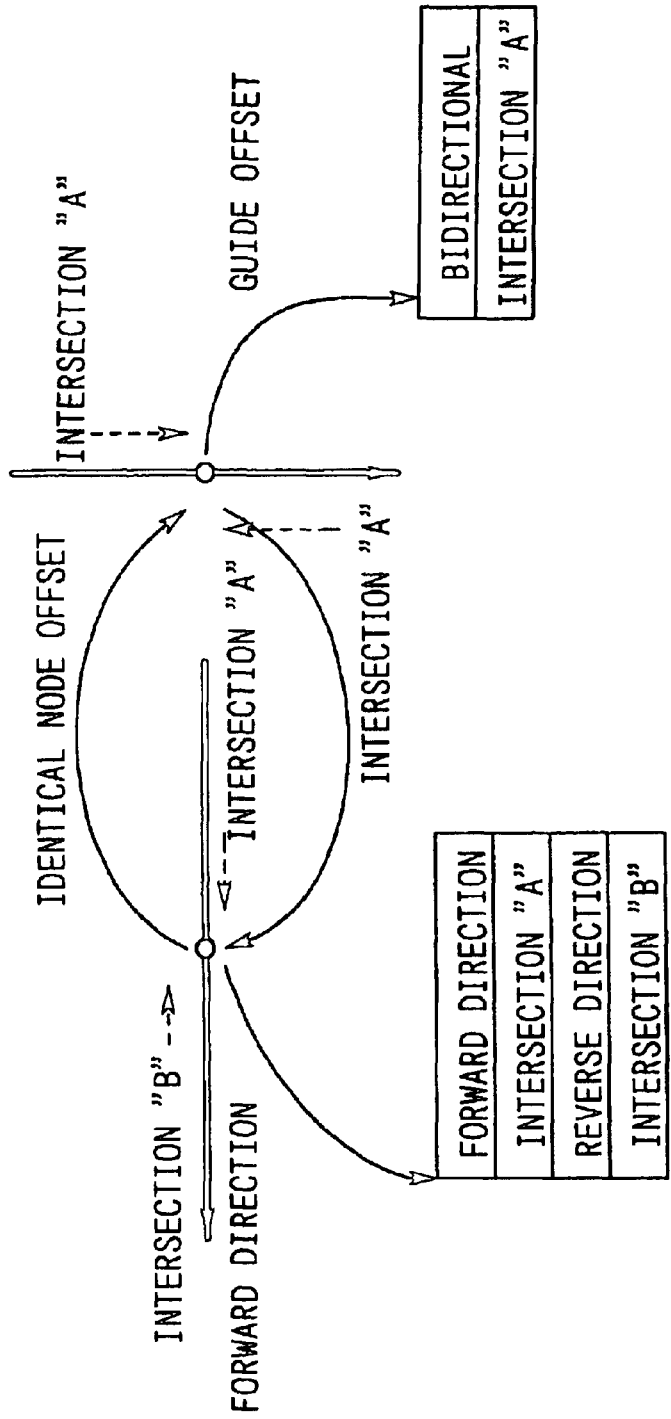

DATA STORAGE METHOD 2: THREE LINK STRINGS

DATA STORAGE METHOD 3: FOUR LINK STRINGS

STATE AT INTERSECTION

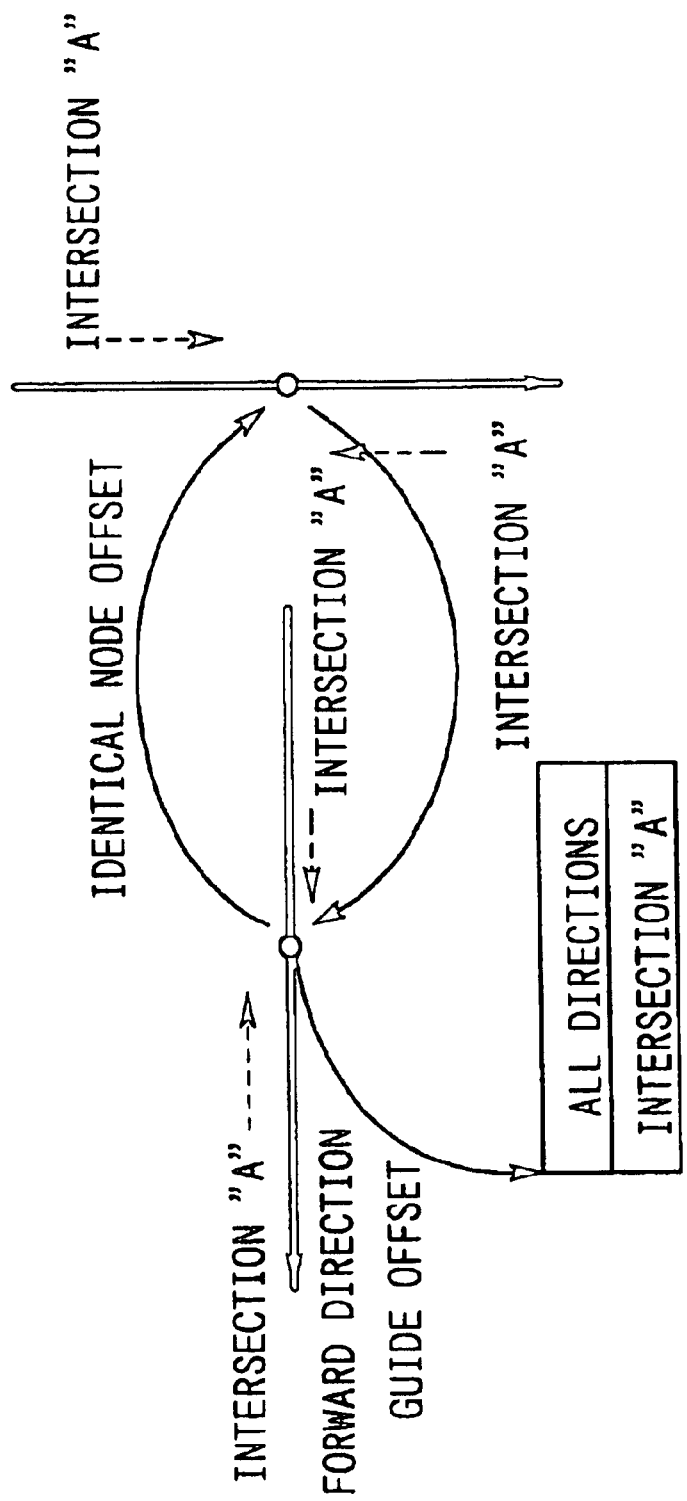

DATA STORAGE METHOD 2: THREE LINK STRINGS

DATA STORAGE METHOD 3: FOUR LINK STRINGS

STATE AT INTERSECTION

DATA STRAGE METHOD 1: TWO LINK STRINGS

STATE AT INTERSECTION

DATA STRAGE METHOD 1: TWO LINK STRINGS

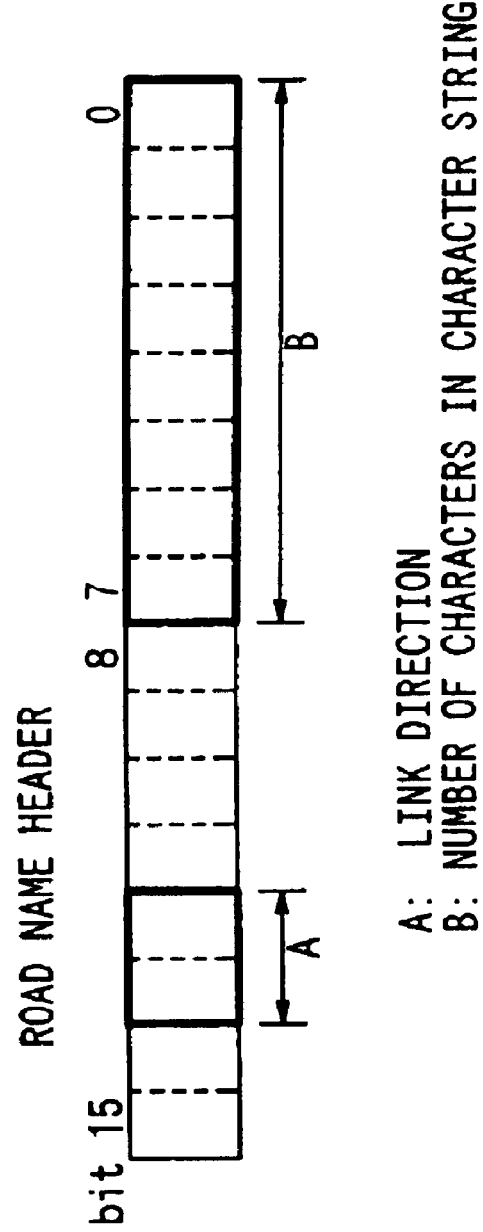

FIG. 18B

| ITEM NUMBER | BIT | DETAILS | | | |
|---|---|---|---|---|---|
| 1 | 15-14 | (RESERVED) | | | |
| 2 | 13-12 | LINK DIRECTION | bit 13 | bit 12 | MEANING |
| | | | 0 | 0 | (RESERVED) |
| | | | 0 | 1 | FORWARD DIRECTION (MATCHING THE ORDER IN WHICH LINK STRINGS ARE STORED) |
| | | | 1 | 0 | REVERSE DIRECTION (REVERSE OF THE ORDER IN WHICH LINK STRINGS ARE STORED) |
| | | | 1 | 1 | BIDIRECTIONAL (NO DIRECTIONALITY) |
| 3 | 11-8 | (REVERSED) | | | |
| 4 | 7-0 | NUMBER OF CHARACTERS IN CHARACTER STRING | | | |

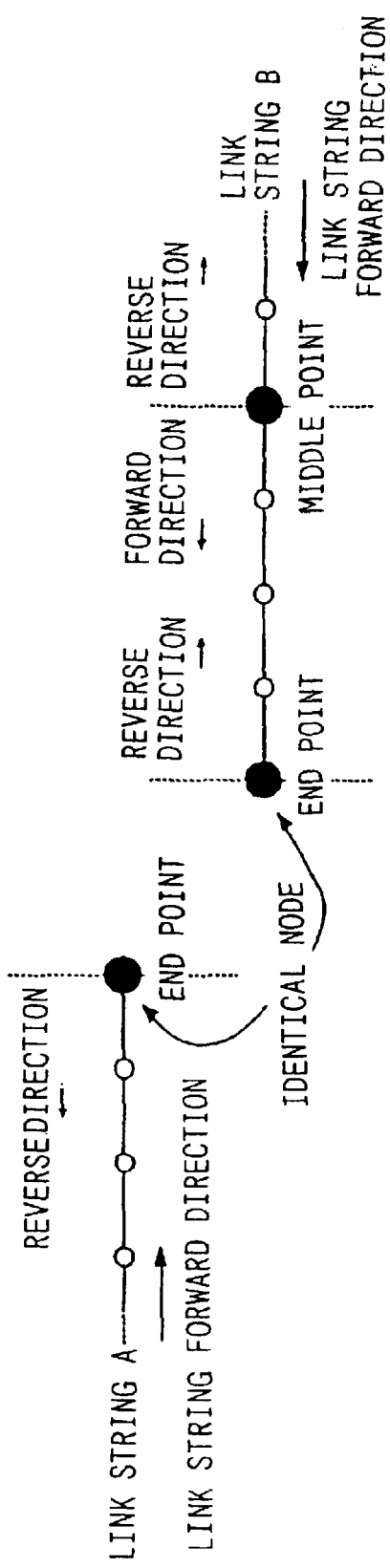

STATE AT INTERSECTION

DATA STORAGE METHOD 1: TWO LINK STRINGS

STATE AT INTERSECTION

DATA STORAGE METHOD 1: TWO LINK STRINGS

DATA STORAGE METHOD 1: TWO LINK STRINGS

DATA STORAGE METHOD 2: THREE LINK STRINGS

DATA STORAGE METHOD 3: FOUR LINK STRINGS

FIG. 24B

| ITEM NUMBER | BIT | DETAILS | | | MEANING |
|---|---|---|---|---|---|
| 1 | 15-14 | (RESERVED) | | | |
| 2 | 13-12 | LINK DIRECTION | bit 13 | bit 12 | |
| | | | 0 | 0 | (RESERVED) |
| | | | 0 | 1 | FORWARD DIRECTION (MATCHING THE ORDER IN WHICH LINK STRINGS ARE STORED) |
| | | | 1 | 0 | REVERSE DIRECTION (REVERSE OF THE ORDER IN WHICH LINK STRINGS ARE STORED) |
| | | | 1 | 1 | BIDIRECTIONAL (NO DIRECTIONALITY) |
| 3 | 11-8 | (REVERSED) | | | |
| 4 | 7-0 | NUMBER OF CHARACTERS IN CHARACTER STRING | | | |

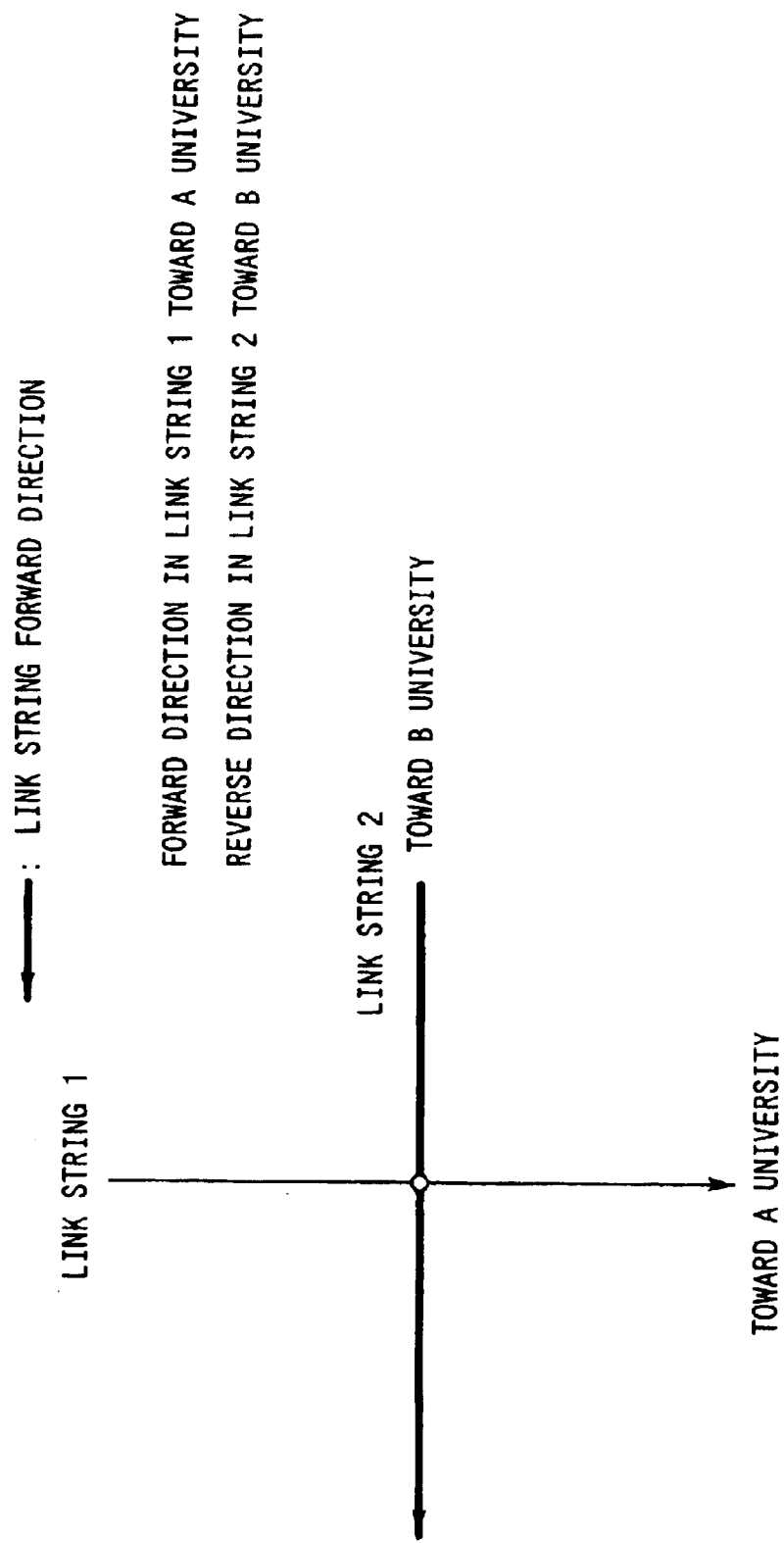

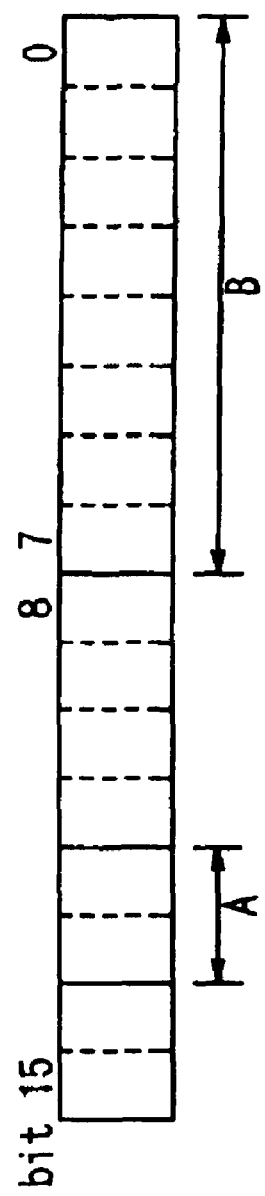

FIG. 25B

| ITEM NUMBER | BIT | DETAILS | | | MEANING |
|---|---|---|---|---|---|
| | | | bit 13 | bit 12 | |
| 1 | 15-14 | (RESERVED) | | | |
| 2 | 13-12 | LINK DIRECTION | 0 | 0 | ALL DIRECTIONS (SAME NAME IN ALL DIRECTIONS OF APPROACH) |
| | | | 0 | 1 | FORWARD DIRECTION (MATCHING THE ORDER IN WHICH LINK STRINGS ARE STORED) |
| | | | 1 | 0 | REVERSE DIRECTION (REVERSE OF THE ORDER IN WHICH LINK STRINGS ARE STORED) |
| | | | 1 | 1 | BIDIRECTIONAL (NO DIRECTIONALITY) |
| 3 | 11-8 | (REVERSED) | | | |
| 4 | 7-0 | NUMBER OF CHARACTERS IN CHARACTER STRING | | | |

⇐ : LINK STRING FORWARD DIRECTION

"ABC..." IN LINK STRING 1 IN ALL DIRECTIONS
"XYZ..." IN LINK STRING 2 IN ALL DIRECTIONS

⇐ : LINK STRING FORWARD DIRECTION

"ABC..." IN LINK STRING 1 IN REVERSE DIRECTION
"XYZ..." IN LINK STRING 1 BIDIRECTIONAL
"ABC..." IN LINK STRING 2 BIDIRECTIONAL
"XYZ..." IN LINK STRING 2 BIDIRECTIONAL

STRUCTURE OF ROUTE SEARCH DATA

STRUCTURE OF RECOMMENDED ROUTE DATA

NODE INFORMATION AND LINK INFORMATION
IN RECOMMENDED ROUTE DATA

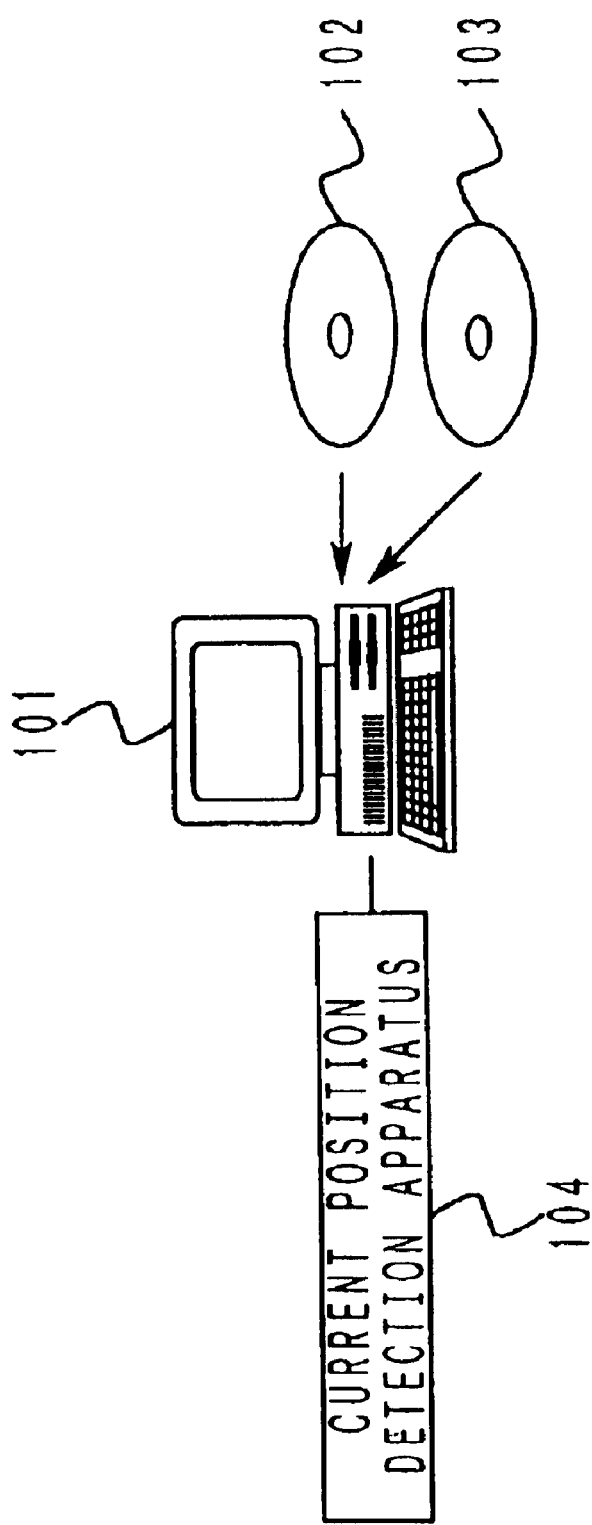

MAP DATABASE APPARATUS

INCORPORATION BY REFERENCE

This is a continuation of Application Ser. No. 08/989,240, filed Dec. 12, 1997.

The disclosures of the following priority applications are herein incorporated by reference.

Japanese Patent Application No. 8-332562 filed Dec. 12, 1996.

BACKGROUND OF THE INVENTION

1. Field of the Invention

The present invention relates to a map database apparatus employed in a navigation system that performs route guidance.

2. Description of the Related Art

Vehicular navigation systems in the known art are provided with a function for displaying a roadmap of the area where the vehicle is currently located, a function for accurately detecting the vehicle position through map matching, a function for calculating a recommended route from a point of departure to a destination, a function for performing route guidance and the like. In these vehicular navigation systems in the prior art, roadmap display data, data for map matching, data for route search and route guide data are stored in a CD ROM in order to maintain compatibility with existing software programs and also to improve the processing speed.

Route guide data stored in a map database apparatus, which include intersection names, road names and the like, are used for route guidance, and since character strings and the like are included in the route guide data, the data volume is very large, thereby necessitating efficient data processing. In addition, since an intersection is assigned a single, uniform name regardless of the direction from which the vehicle approaches the intersection, there is a problem in that accurate route guidance cannot be implemented at an intersection to which different names are assigned depending upon the direction from which it is approached.

SUMMARY OF THE INVENTION

An object of the present invention is to provide a map database apparatus that is capable of implementing accurate route guidance by causing route guide data to have directional characteristics and can be used to achieve efficient route guide data processing.

In order to attain this object, a map database apparatus according to the present invention manages roads by expressing the roads as link strings. Each of the link strings is constituted by connecting a plurality of links, each of the links has nodes at a front end and a rear end respectively, the map database apparatus has node information concerning the nodes, and the node information includes guide data to be used for route guidance. And, the guide data have directional characteristics corresponding to an order in which the links are connected.

BRIEF DESCRIPTION OF THE DRAWINGS

FIG. 4 shows the structure of roadmap display data.

FIGS. 8A through 8C show the relationship between a node in link string data and guide data corresponding to the node.

FIGS. 9A through 9D show the intersection name header in guide data.

FIGS. 18A through 18D show the road name header in guide data.

FIGS. 19A through 19C show setting road name data in guide data at the start point node, the end point node and the middle point node in a link string.

FIGS. 24A through 24C show the course sign header in guide data.

FIG. 32 illustrates the navigation system of FIG. 1 established by a personal computer.

DESCRIPTION OF THE PREFERRED EMBODIMENTS

Preferred Embodiment

Figure 1:
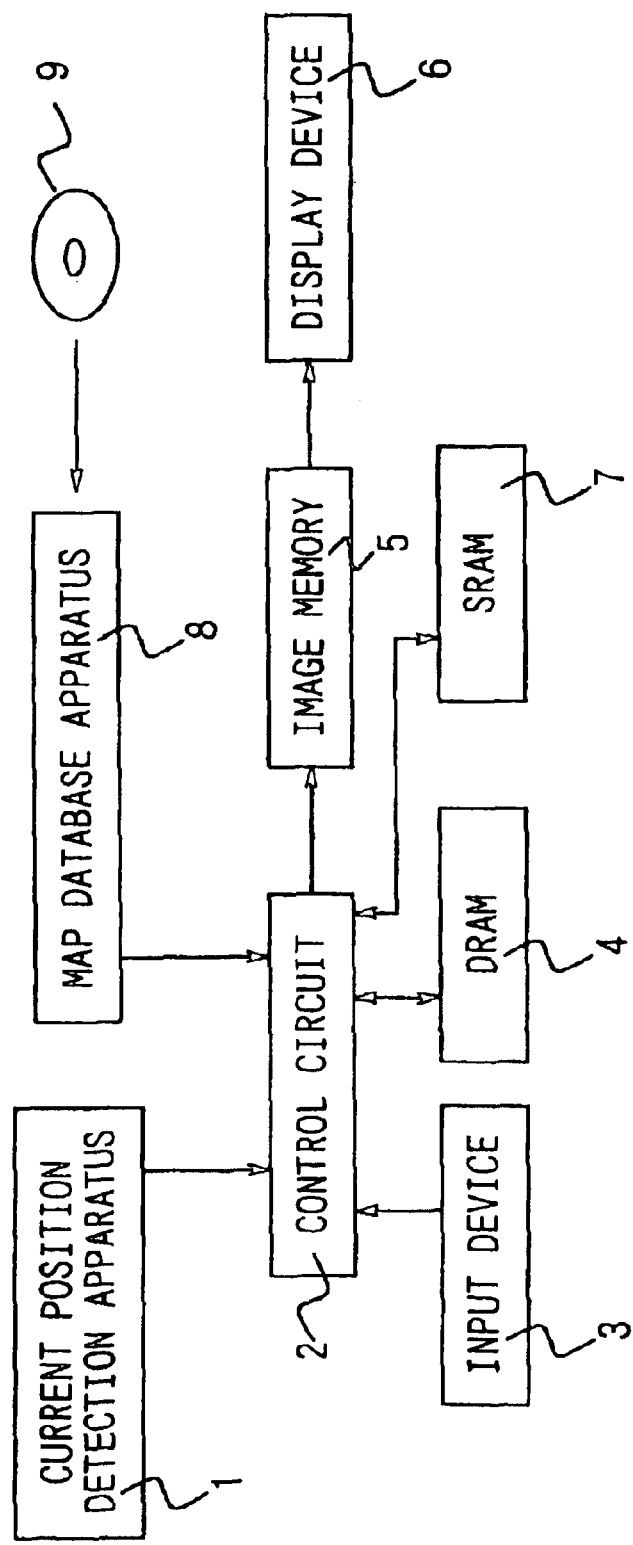
FIG. 1 shows a block diagram of an embodiment of a navigation system for vehicles according to the present invention.

FIG. 1 is a block diagram of an embodiment of a navigation system for vehicles that is internally provided with a map database apparatus according to the present invention. In FIG. 1, reference number 1 indicates a current position detection apparatus that detects the current position of a vehicle, which is constituted with, for instance, an azimuth sensor that detects the bearing of the vehicle while traveling, a vehicle speed sensor that detects the speed of the vehicle, a GPS sensor that detects a GPS signal from a GPS (Global Positioning System) satellite and the like.

Reference number 2 indicates a control circuit that controls the entire system and is constituted with a microprocessor and peripheral circuits. Reference number 3 indicates an input device for inputting destinations and the like for vehicles, reference number 4 indicates a DRAM that stores vehicle position information and the like detected by the current position detection apparatus 1, reference number 5 is an image memory that stores image data for display on a display device 6 and image data stored in the image memory 5 are read out as necessary to be displayed on the display device 6. Reference number 7 indicates an SRAM that stores node information, link information and the like on the recommended route calculated by the control circuit 2.

Reference number 8 indicates a map database apparatus that stores various types of data for implementing road map display, route search, route guidance and the like, which may be constituted of, for instance, a CD ROM device, a floppy disk device or the like. Reference number 9 indicates a recording media which is loaded into this map database apparatus and in which the above data is stored. The recording media may be a CD-ROM for example. When the map database apparatus is refereed to, the map database normally includes the recording media. In the map database apparatus 8, map display data comprising information on road forms, information on road classifications and the like, route guide data comprising intersection names and the like and route search data comprising branching information and the like which are not directly related to road forms are stored. The map display data are mainly used when displaying a road map on the display device 6, the route search data are mainly used when calculating a recommended route and the route guide data are used when guiding a driver or the like through a recommended route that has been calculated. It is to be noted that while, in this embodiment, the map database apparatus 8 includes both the medium, such as a CD ROM, and the drive device, the present invention is not restricted to this arrangement. Since the contents of the present invention apply in the data stored in the medium, the map database apparatus can be conceived as an object in which such data are stored.

Next, the data structures of the map display data, the route guide data and the route search data which are stored in the map database apparatus 8 and the data structure of the recommended route data which are obtained as a result of calculation are explained.

[1] Map display data
(1) Overview of link string data

Figure 2:
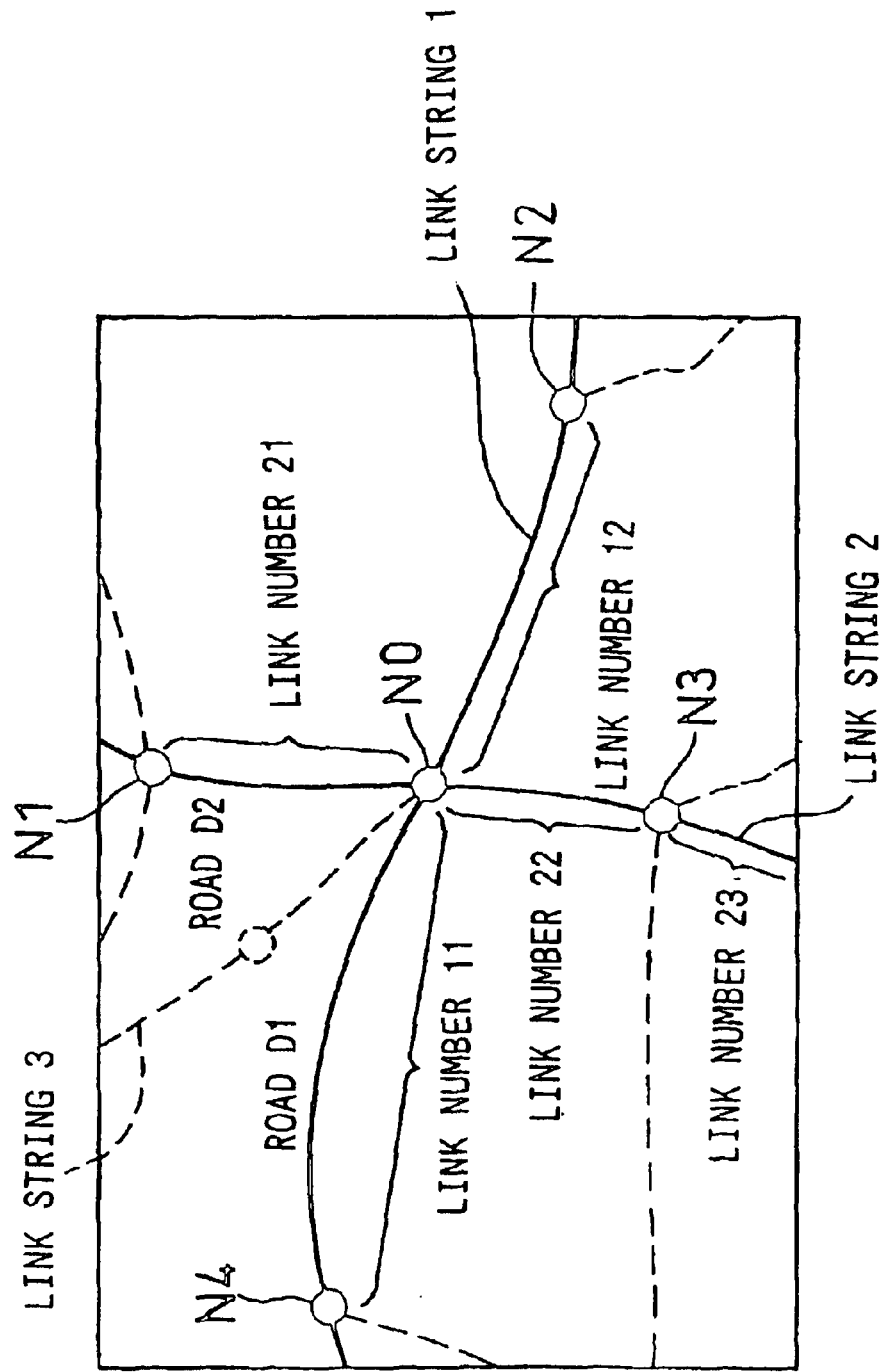
FIG. 2 shows an example of two roads intersecting within a mesh range.

Data management of the map display data in this embodiment is performed for each mesh range representing one of the partitioned areas achieved by dividing a roadmap into specific ranges, and individual roads present in a mesh range constitute separate link strings. For instance, as shown in FIG. 2, when two roads D1 and D2 intersect in one mesh range, the two roads constitute separate link strings 1 and 2, with the link string 1 comprising links 11 and 12 and the link string 2 comprising links 21–23. In this example, the links in the link string 1 and the links in the link string 2 represent roads of the same type. A link is the minimum unit that can represent a road and, in FIG. 2, the segment between the intersections constitutes one link unit, with inherent numbers assigned to the individual links (hereafter referred to as link numbers) for identification. The intersections in FIG. 2, i.e., the connection points of the individual links are expressed as nodes N0 N4. Nodes also constitute the start points and the end points of the individual links and, as detailed later, interpolation points that further divide the segments between nodes may sometimes be provided as well.

Figure 3:
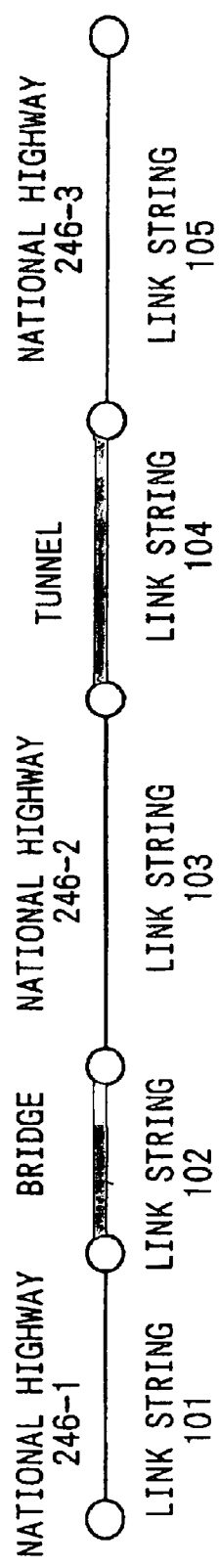
FIG. 3 shows a diagram illustrating link string data.

Also, in this embodiment, when there is a distinct structure such as a bridge, a tunnel or the like, on a road, the portions of the road preceding and following the structure constitute separate link strings. For instance, when there is a bridge and a tunnel on National Highway 246, as shown in FIG. 3, the portions preceding the bridge and the tunnel, the blocks corresponding to the bridge and the tunnel and the portions following the bridge and the tunnel all constitute separate link strings. In FIG. 3, these strings are designated as link strings 101–105. By making the portions preceding and following a distinctive structure on a road separate link strings, search of bridges, tunnels and the like on a roadmap is facilitated.

The map display data comprise a plurality of sets of data at different scales. In the explanation of this embodiment, the data at each scale are referred to as level n (n may be 14, for instance) data. Level 1 corresponds to the most detailed roadmap and as the level goes up, a roadmap over a wider range is presented at a smaller scale. A smaller map scale in this context refers to the fact that the scale of a map with, for instance, a 1/40000 scale factor is smaller than a map with a 1/10000 scale factor for a given area, and a road map at a smaller scale, therefore, covers a wider area.

(2) Data structure of link string data

To give an explanation of the roads in FIG. 2, the map display data are structured by providing sets of link string data, each including various types of information related to the link string 1 or 2–n, for individual link strings, as shown in FIG. 4, and the data corresponding to each link string include link string information and node link information, with the link string information comprising the following types of data, as shown in FIG. 4.

Link String Information
   1 link string size
   2 number of element points
   3 link attribute
   4 road name offset
   5 road number In addition, the node link information comprises the following types of data, as shown in FIG. 4.

Node Link Information
   1 attribute 1+X coordinate
   2 attribute 2+Y coordinate
   3 identical node offset
   4 guide offset
   5 link number
   6 altitude information (3) Link String Information In FIG. 4, the link string size represents the storage size of the link string data, by referring to this storage size, prompt access to the next link string data is achieved. The number of element points data indicate the total number of node points and interpolation points, the link string attribute data indicate the type of road, such as a national highway, a prefectural road, an expressway or the like and the road number is the actual designation number assigned to a national highway or prefectural road. The road name offset indicates a top address of storage area where the road name is stored with character codes.

(4) Node link information

Figure 5:
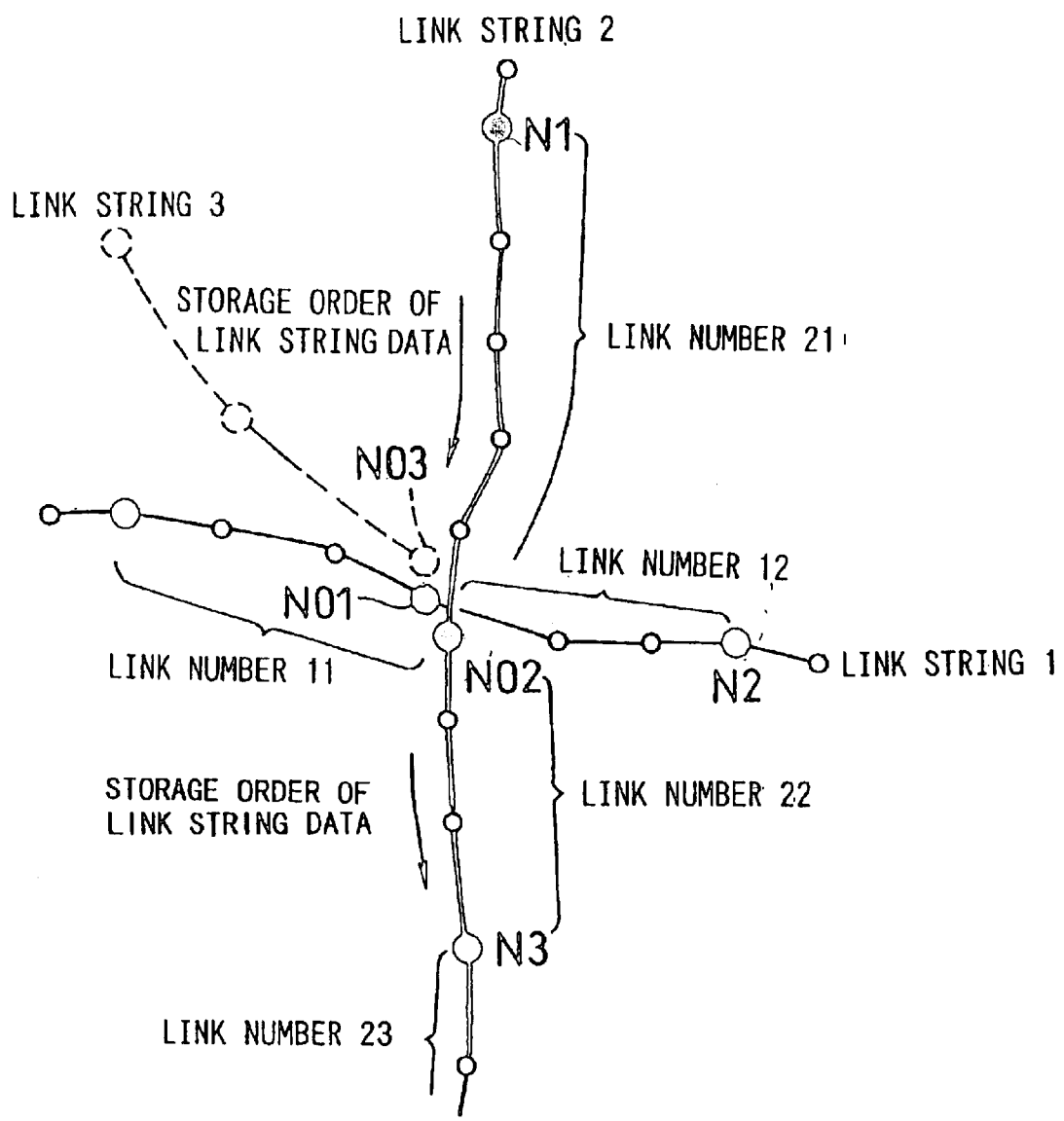
FIG. 5 shows an example of a roadmap with a plurality of nodes and a plurality of interpolation points.
Figure 6:
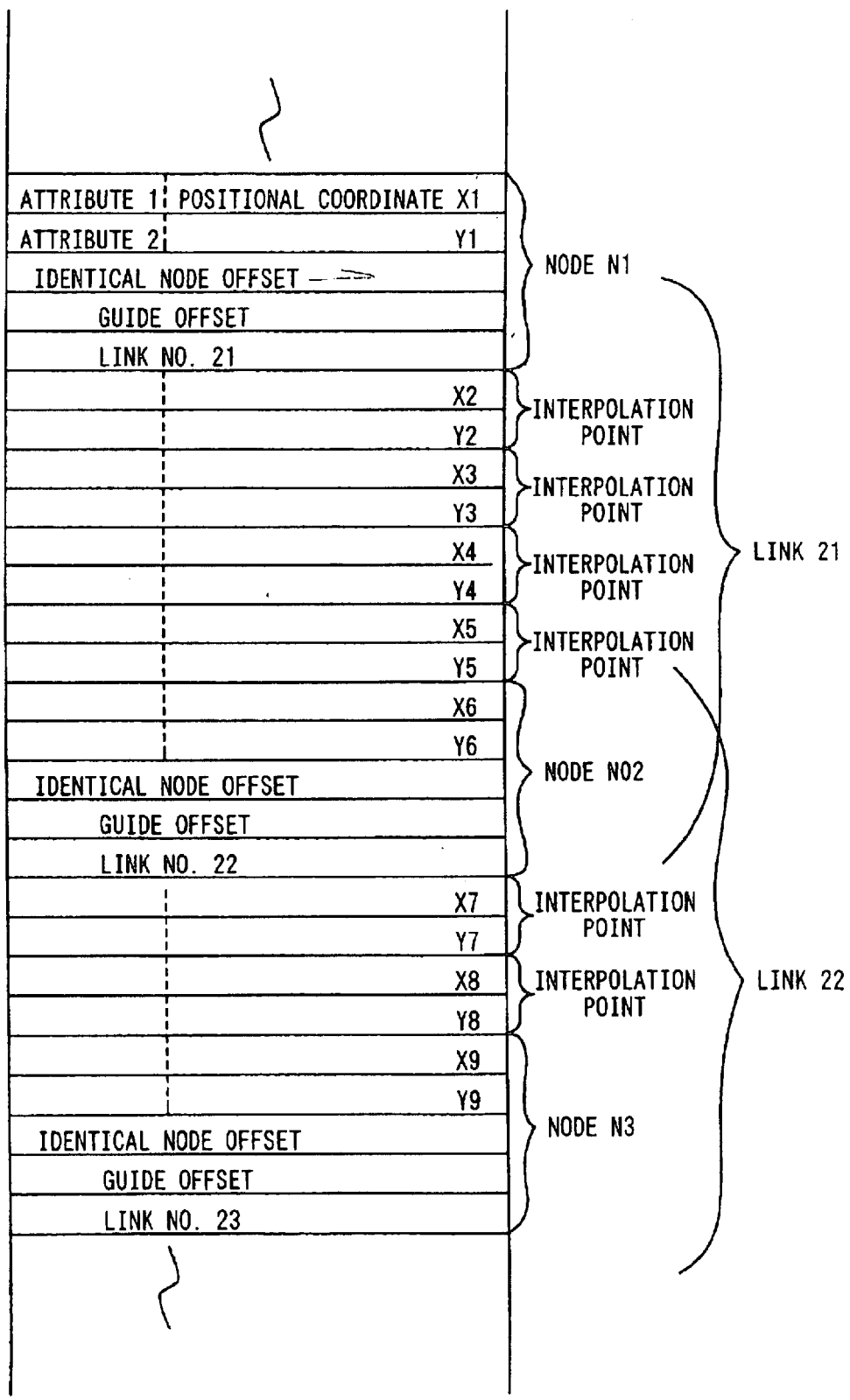
FIG. 6 shows a diagram illustrating the link string data corresponding to the road indicated with the bold line in FIG. 5.

FIG. 5 shows the link strings 1 and 2 in FIG. 2 in more detail. For instance, the node link information of the link string 2 indicated with the bold line in FIG. 5 is as shown in FIG. 6. As shown in the figure, the data on the link string 2 include node information related to nodes N1, N02 and N3 (filled circles in FIG. 5) on the link string and interpolation point information related to the interpolation points (outline circles in FIG. 5). Interpolation points are indicated as empty circles in FIG. 5, and information on the shape of a curved link is presented as coordinates of the individual points. The node information includes the positional coordinates X and Y of the node, the attribute of links connected to the node, the identical node offset, the guide offset and the link numbers of the links connected to the node, whereas the interpolation point information includes the positional coordinates X and Y of the interpolation point. These positional coordinates are used as physical form data for recommended route display or physical form data for map matching. The link string 2 indicated with the bold line in FIG. 5 includes a link assigned with a link number 21 located between the nodes N1 and N02, a link assigned with a link number 22 located between the nodes N02 and N3 and a link assigned with a link number 23 connected to the node N3. As is obvious from FIG. 6, the node information on the node N02 is shared by the link with link number 21 and the link with link number 22. The node information and the interpolation point information are positioned in the data structure in the order in which the links are connected. Thus, by sequentially reading out the link string data starting with the front end address, the road physical form, the road type and the like of the overall link string can be detected.

Next, the identical node offset is explained, and then the guide offset will be explained in reference to, and together with the guide data. An explanation of the height information will be excluded from the explanation given in reference to this embodiment.

(5) Offset Indicating an Identical Node

In FIG. 5, of the nodes at the intersection of the link string 1 and the link string 2 and the link string 3, the node in the link string 1 is assigned with a reference number N01, the node in the link string 2 is assigned with a reference number N02 and the node in the link string 3 is assigned with a reference number N03. In the data structure, the sets of node information corresponding to the intersecting points N01 N03 each has a data item referred to as an identical node offset.

Figure 7:
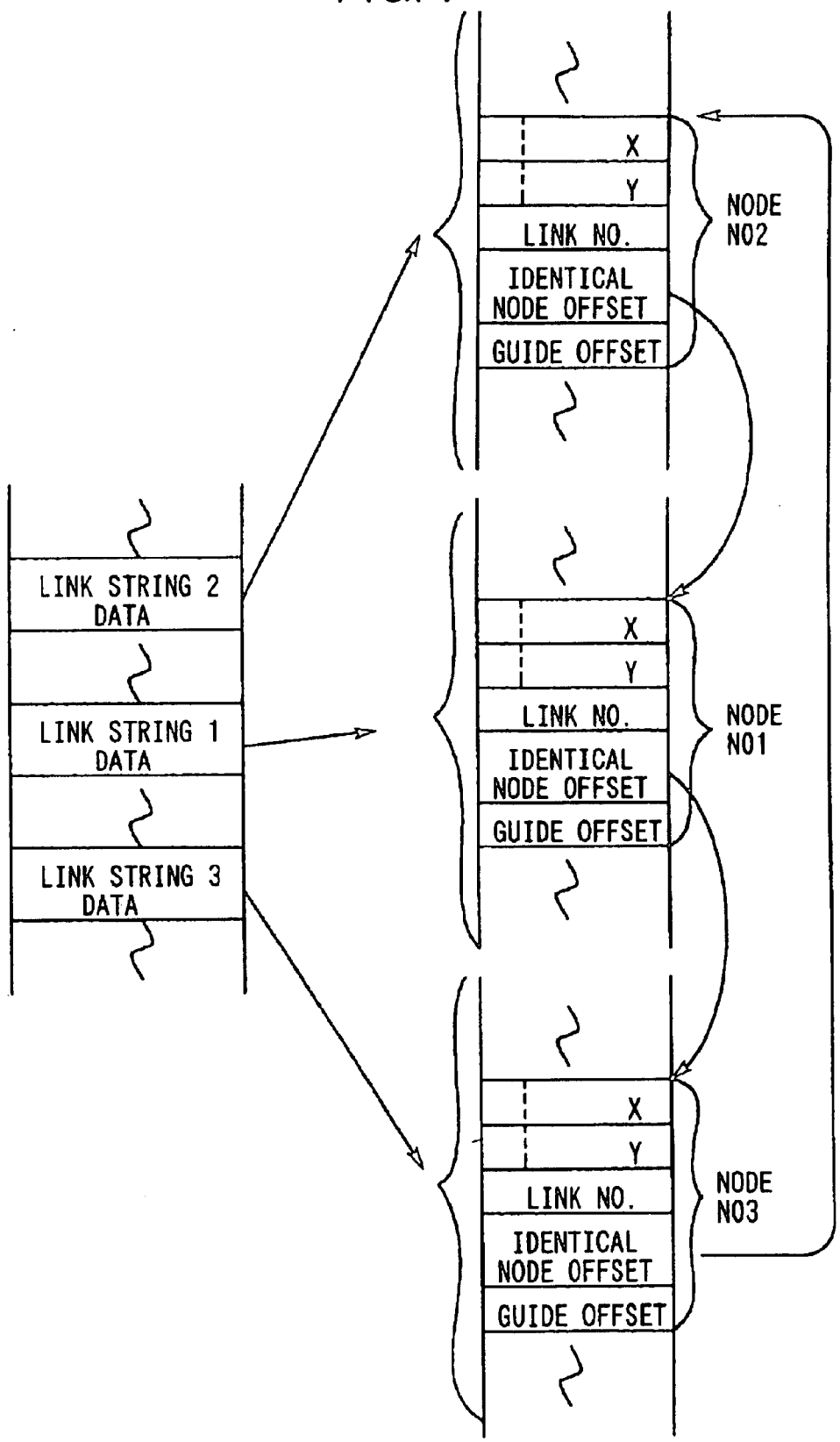
FIG. 7 shows a diagram illustrating offset information that is added into link string data for reading out immediately preceding data.

The identical node offset is explained in detail in reference to FIG. 7. For instance, the address value indicating a storage area for the node information of the node N01 in the link string 1 is stored in memory as the identical node offset of the node N02 in the link string 2. Likewise, the address value indicating the storage area for the node information of the link string 3 is stored in memory as the identical node offset of the node N01 of the link string 1 and the address value of the address at which the node information of the node N02 in the link string 2 is stored in memory as the identical node offset of the node N03 in the link string 3.

Since nodes other than those at intersection, which are indicated as the intersecting points N01–N03 in FIG. 5, do not intersect other roads, a specific value, i.e., FFFFh, for instance, that indicates that no other node exists to constitute an identical node, is stored in the identical node offset storage areas of the node information for these nodes.

By providing the identical node offset in this manner, even when there are a plurality of sets of node information in regard to identical nodes, as in the case of an intersection, the corresponding relationships among the individual sets of node information can be easily ascertained.

[2] Guide Data

Guide data are data that are used to guide a driver or the like through a recommended route that has been searched in a route search. For instance, if a recommended route makes a right turn at an intersection, the information on the intersection may be displayed in an enlargement on the display device 6 to facilitate understanding of the situation at the intersection for the driver or the like, or voice guidance may be issued, such as "turn right at intersection ABC 100 meters ahead in direction XYZ," as the vehicle approaches the intersection.

The information used for guidance includes basic data which include intersection names, road names and course (direction) sign information, and expansion data such as landmark information. The landmark information refers to information on landmarks such as buildings including gas stations and convenience stores, as well as large billboards. In this embodiment, these different types of information are stored in the map database apparatus 8 and used in the following manner. The details are given below.

FIG. 8 illustrates the relationship between a node in link string data and the guide data corresponding to the node. As shown in FIG. 4 and FIG. 8A, the node link information in the link string data contains a guide offset. The guide offset contains an index that indicates a position at which the guide data corresponding to the node are stored. Since, in this embodiment, a word is constituted of 16 bits and the section in FIG. 6 is presented in units of words, this guide offset, too, is data constituted of one word. In the data area referenced by the guide offset, the guide data are stored as shown in FIG. 8B. FIGS. 8A–8C illustrate the guide data at a node N02 in link string 2 when the road represented as link string 1 and the road represented as link string 2 intersect each other at an intersection ABC, i.e., at the node N0. In the guide data, intersection names, road names, course sign information, landmark information and the like are stored, and the figures further illustrate how the intersection name table is accessed from the intersection name offset. The individual types of information have corresponding headers which are to be detailed later.

(1) Intersection Names

The following is an explanation of intersection name data in the guide data. The intersection name data are assigned with the one word intersection name header shown in FIG. 9A, and following the intersection name header, the intersection name offset is stored as illustrated in FIG. 8B. The intersection name offset illustrated in FIG. 8B is an index for accessing the table where character strings representing the individual intersection names, as illustrated in FIG. 8C, are stored. The intersection name offset contributes to a reduction in the data quantity, since the character strings representing the intersection names do not have to be provided repeatedly in the guide data for all the individual nodes. In addition, if voice guidance is to be implemented, read data are also stored following the character strings. As shown in FIG. 9B, bits 12–13 in the intersection name header indicate the link direction and bits 0–7 indicate the number of characters in the character string relating to the intersection name that is to be referenced via the intersection name offset. The link directions include four directions, i.e., all directions, forward direction, reverse direction and bidirectional. The link directions as referred to in this context give directional characteristics to the guide data such as the intersection names, and in this embodiment, the link directions indicate the directions of roads that correspond to the direction from which an intersection is approached in which the intersection name can be verified. Also, the forward direction as a link direction is the direction in which the link string data are stored, i.e., the direction leading from the front end of the data toward the rear end of the data, whereas the reverse direction is the opposite direction from the forward direction, i.e. the direction leading from the rear end of the data toward the front end of the data. Normally, a single name is assigned to an intersection regardless of the direction from which intersection is approached. Consequently, in such a case, the bits for "all directions" are set for the link direction. However, there are some intersections assigned with different intersection names depending upon the direction from which they are approached. In order to manage the data efficiently in such a case, link directions are provided for the intersection names.

Figure 9C:
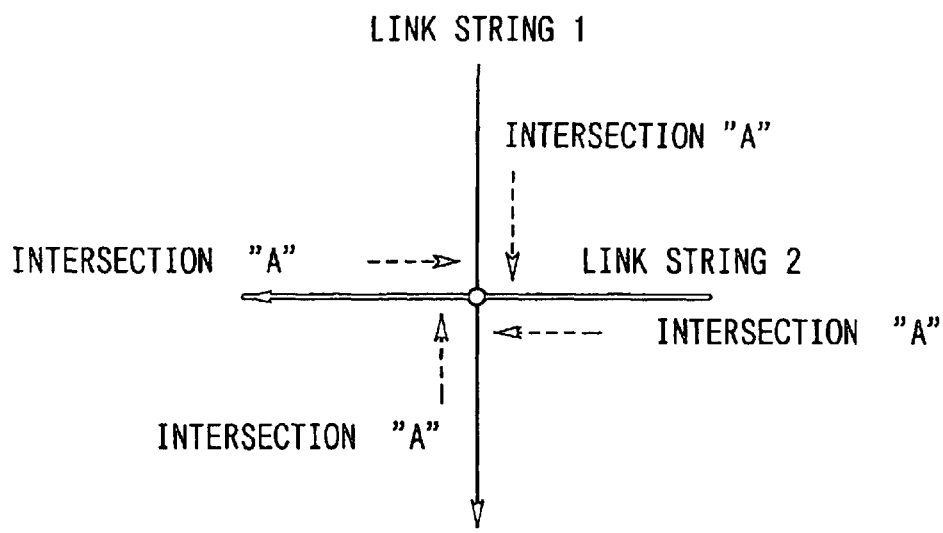
Figure 9D:
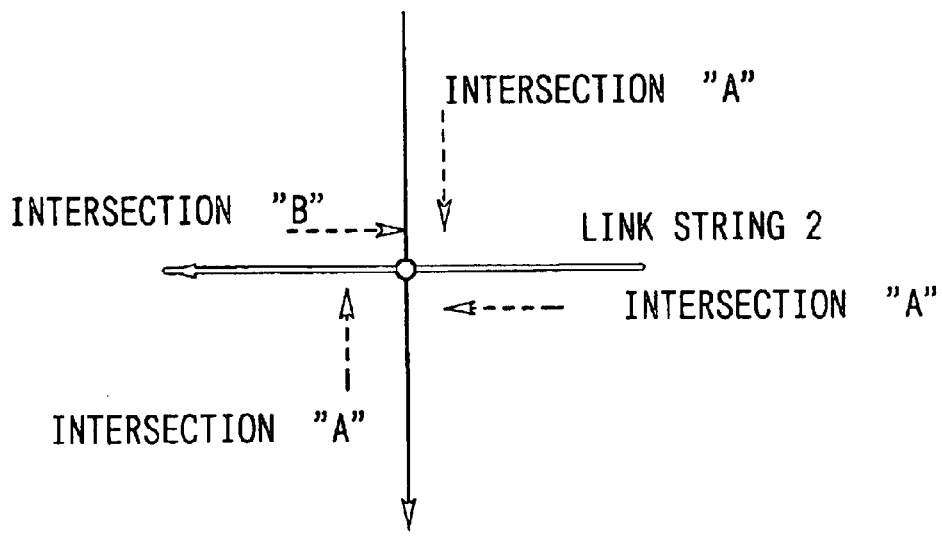

FIGS. 9C and 9D illustrate this point. FIG. 9C illustrates a case in which an intersection is identified with the intersection name "A" regardless of the direction from which it is approached in either link string 1 or link string 2. In this case, the intersection name "A" data with the link direction set to "all directions" are set in the guide data of a node either in link string 1 or link string 2. An explanation is given later on setting the intersection name "A" data in the guide data at only one node either in link string 1 or link string 2. In the case presented in FIG. 9D, while in link string 1, the intersection is identified with the intersection name "A" both in the forward direction and in the reverse direction, in link string 2 the intersection is identified with the intersection name "A" when it is approached in the forward direction and it is identified with the intersection name "B" when it is approached in the reverse direction. In this case, the intersection name "A" with the link direction set to "bidirectional" (no directionality in the link string) is set in the guide data at the node in link string 1, and the intersection name "A" with the link direction set to "forward direction" and the intersection name "B" with the link direction set to "reverse direction" are set in the guide data at the node in link string 2. This ensures that accurate route guidance is implemented since, even when an intersection is assigned with different intersection names depending on the direction from which it is approached, it can be recognized with ease.

Figure 10A:
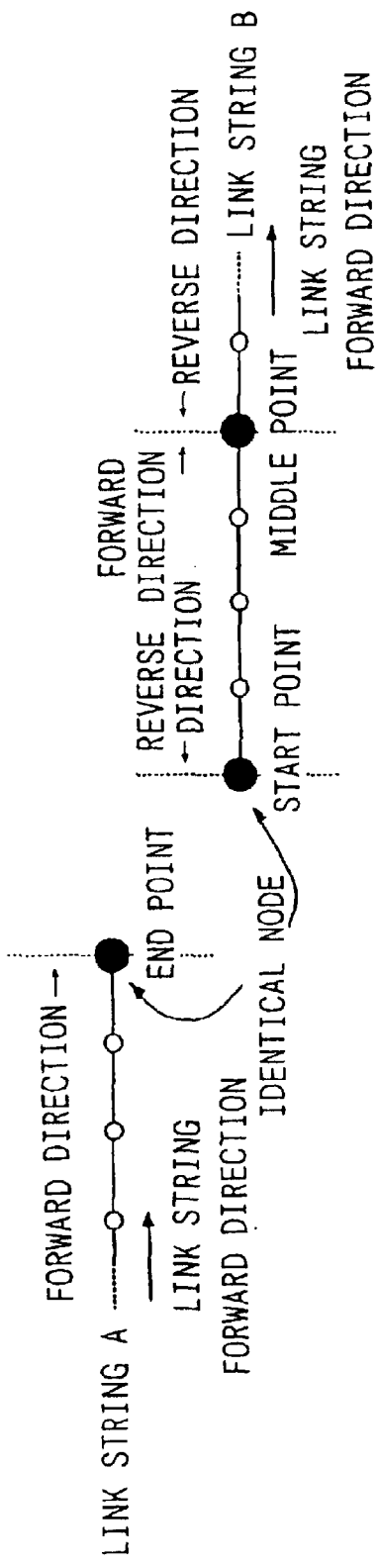
FIGS. 10A through 10C show setting intersection name data in guide data at the start point node, the end point node and the middle point node in a link string.
Figure 10B:
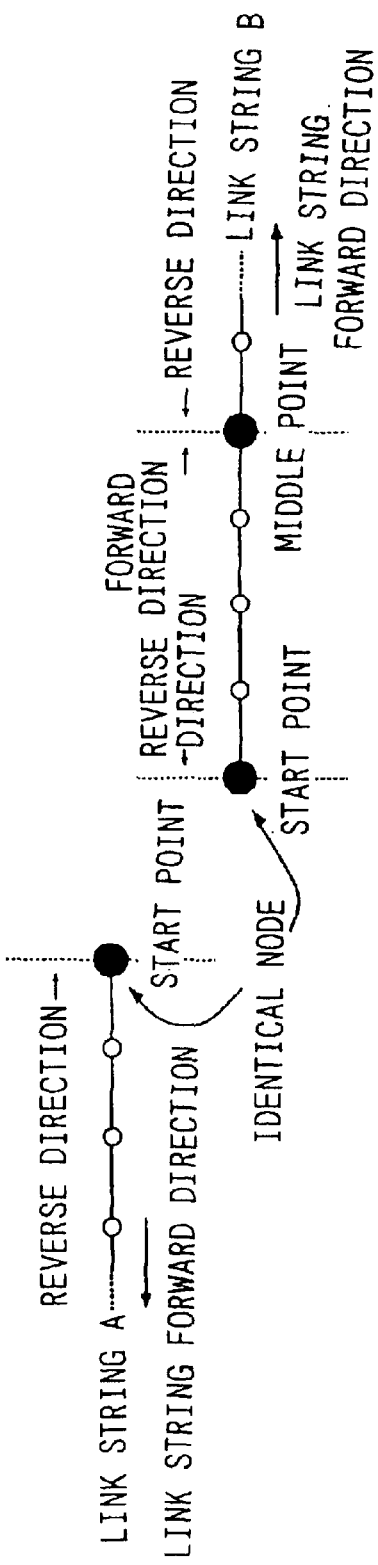
Figure 10C:
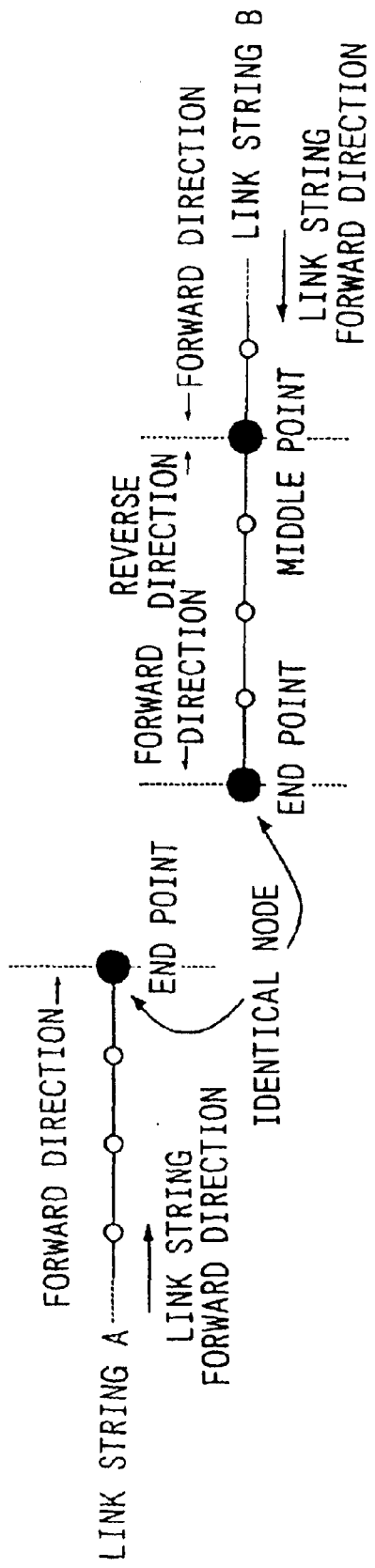

FIG. 10 illustrates setting of the intersection name data in the guide data at the nodes at the start point, the end point and a middle point of a link string. Only the data in the reverse direction are set at the node at the start point of the link string, only the data in the forward direction are set at a node at the end point of a link string and the data in the forward direction and the reverse direction (bidirectional if they are identical) are set at the node at the middle point. In other words, since only the information corresponding to the direction in which the intersection is approached is required as the intersection information, the information corresponding to the direction moving away from the intersection is not needed at the start point and the end point of a link string.

Figure 11B:
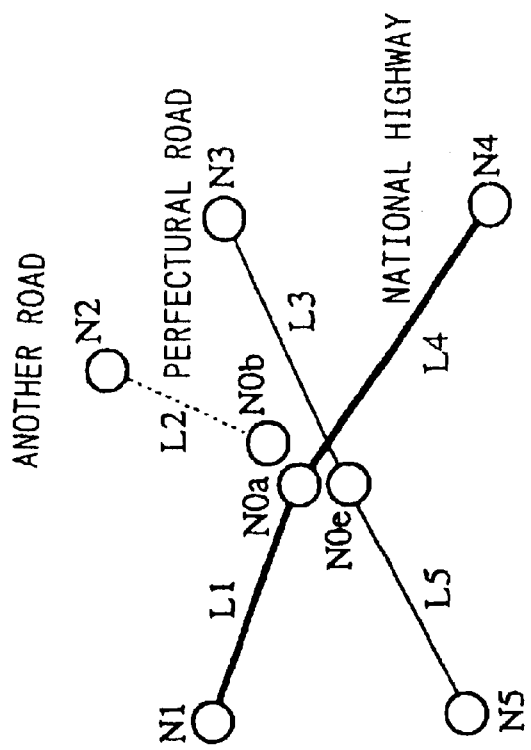
FIGS. 11A through 11C show setting intersection name data when an intersection is assigned with one name for all directions.
Figure 11A:
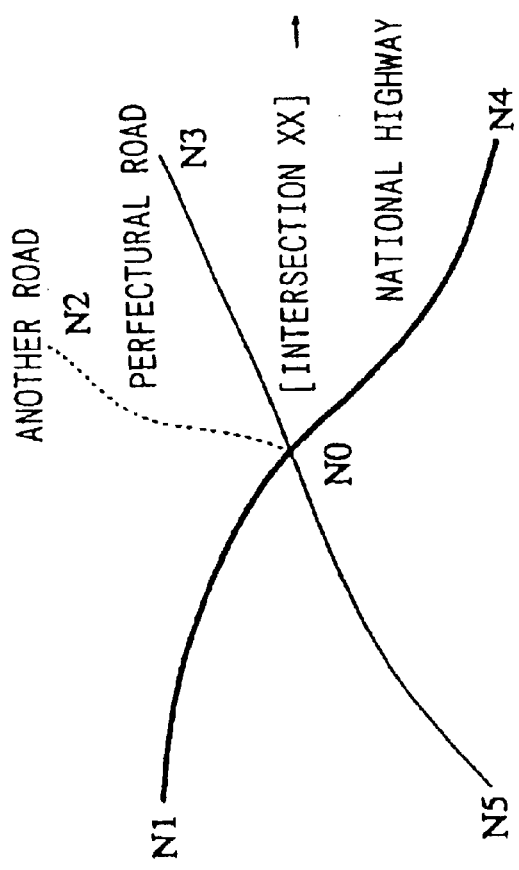
Figure 11C:
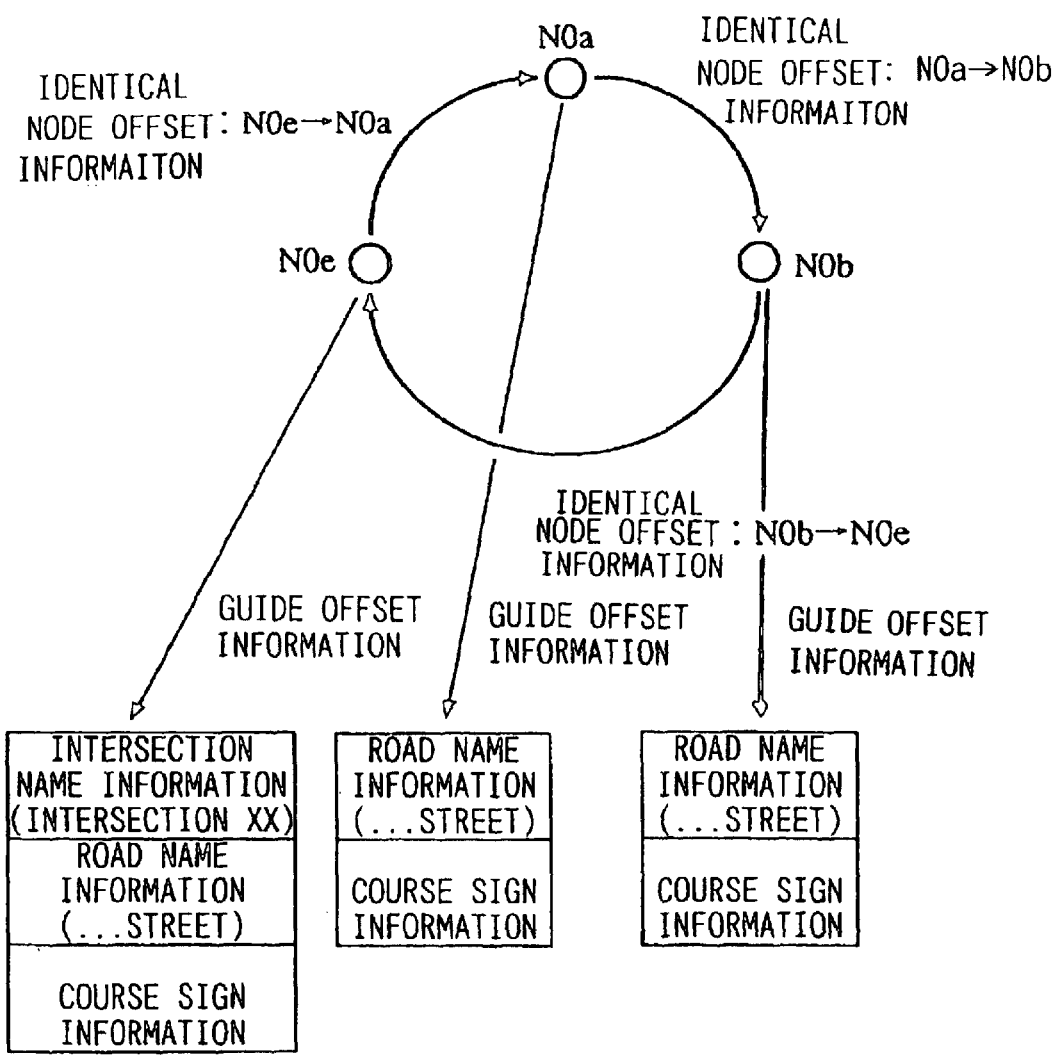

FIG. 11 illustrates how the intersection name data are set when the intersection name is the same in all directions. In FIG. 11A, three roads, i.e., a national highway, a prefectural road and another road intersect at an intersection XX which is identified with one name in all directions from which it is approached. FIG. 11B illustrates this instance with nodes and link strings. FIG. 11C shows the correspondence among the nodes N0*a*, N0*b* and N0*e*, which are related to each other through the identical node offset detailed earlier. In this embodiment, when an intersection name remains the same in all directions, the data indicating the intersection name are set only at one node among the nodes related to each other through the identical node offset. In FIG. 11C, the intersection name "intersection XX" is set only at the node N0*e* in the link string belonging to the prefectural road, and the intersection name data are not set at the other nodes N0*a* and N0*b*. In this manner, the required storage capacity for the guide data can be reduced.

Figure 12:
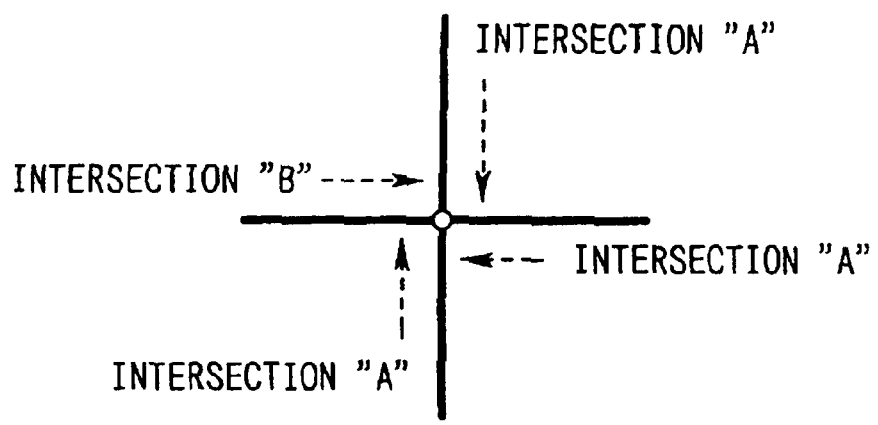
FIGS. 12 through 13C show specific storage methods for intersection name data.
Figure 13B:
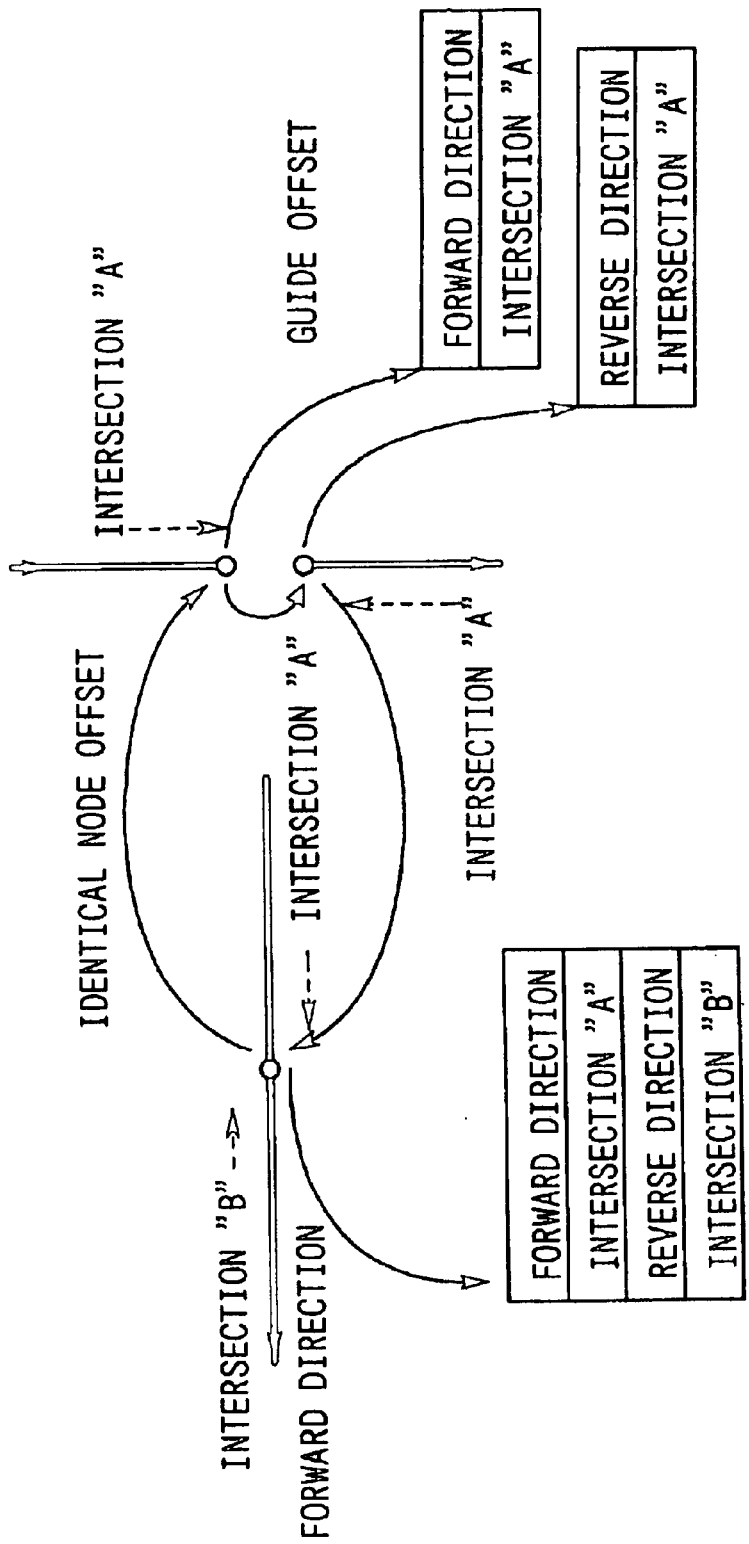
Figure 13C:
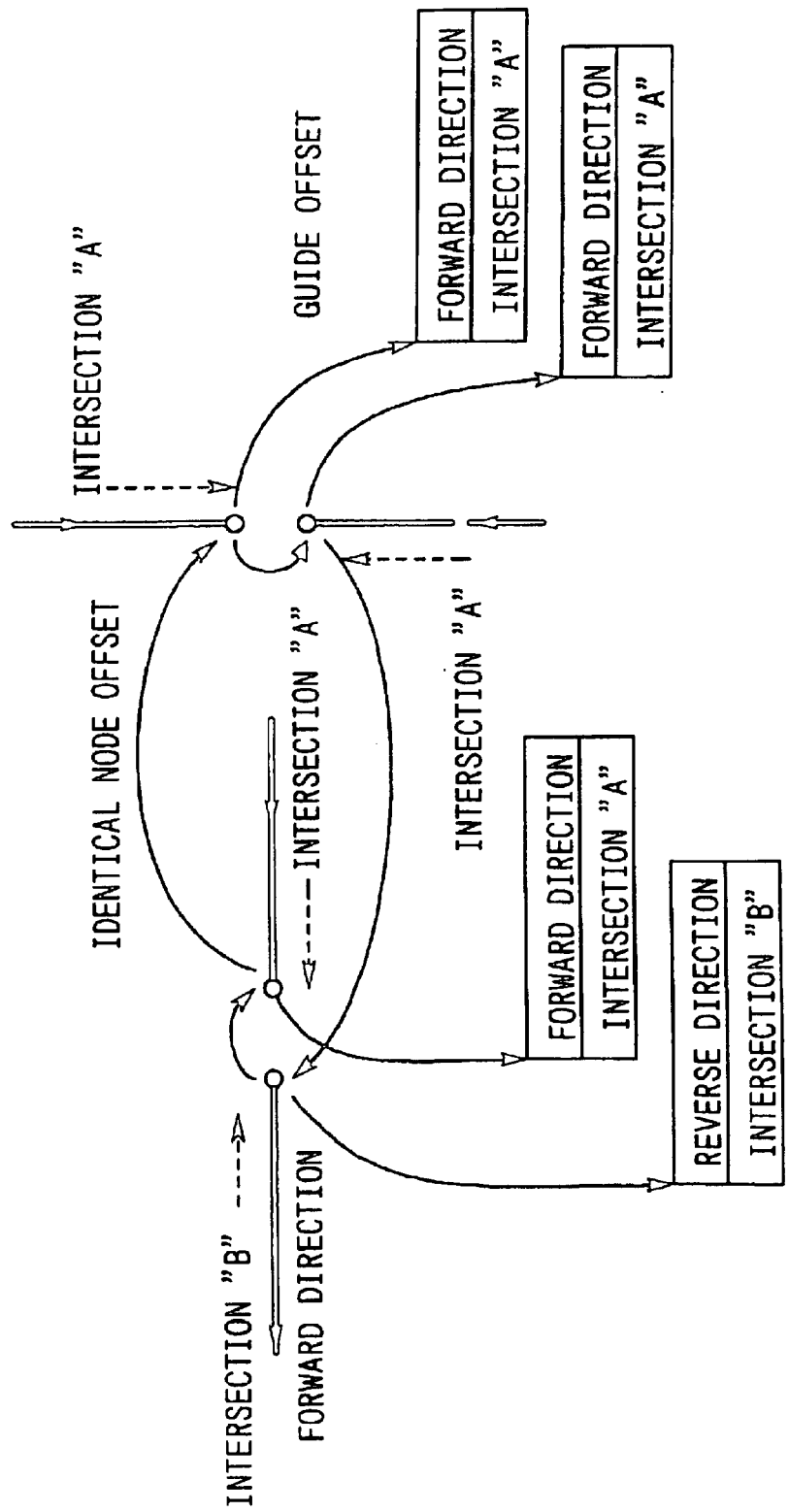
Figure 14:
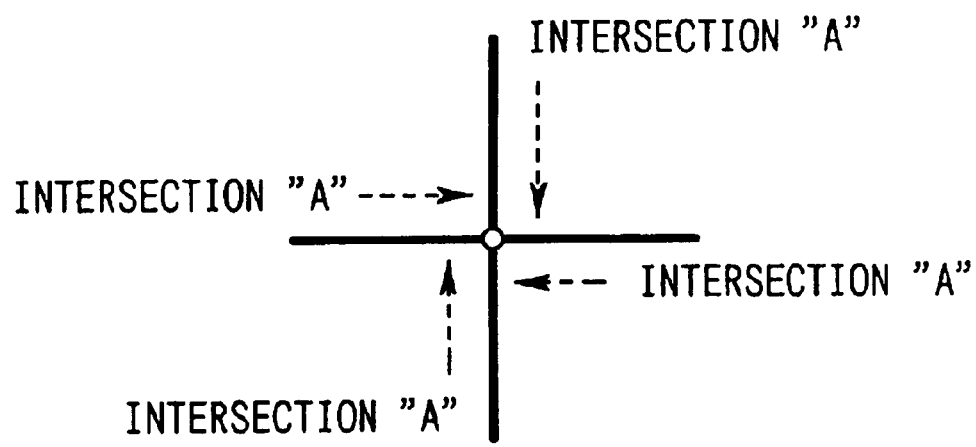
FIGS. 14 through 15C show specific storage methods for intersection name data.
Figure 15B:
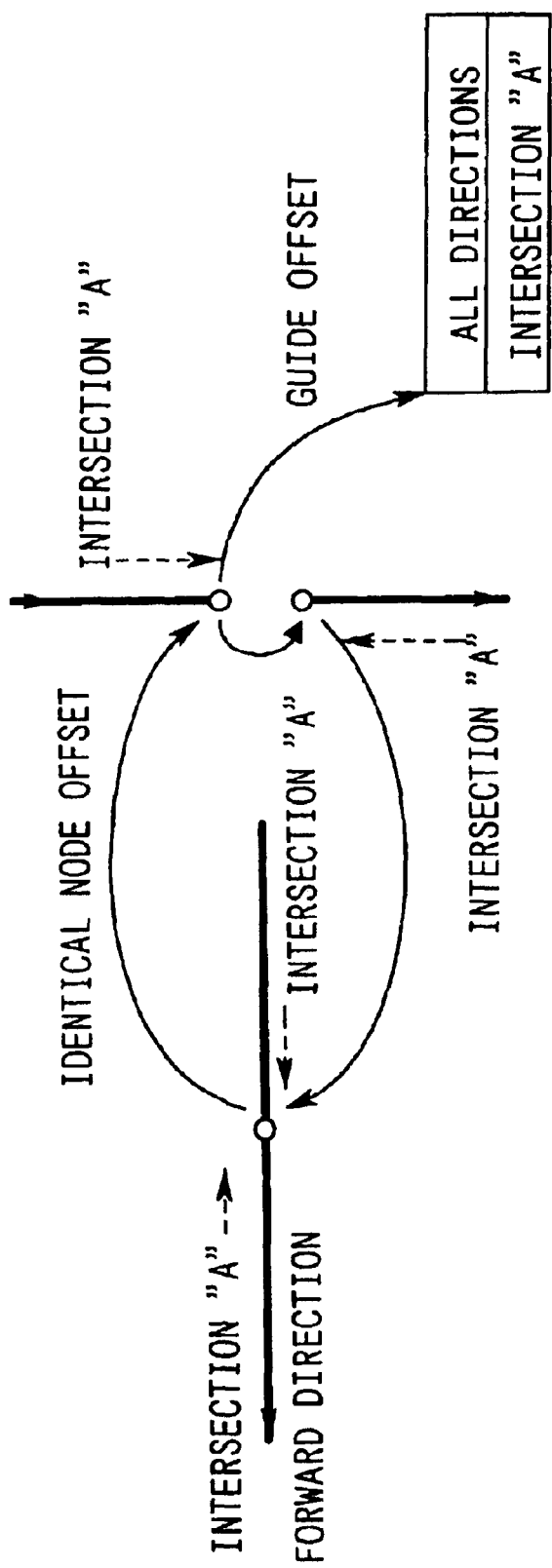
Figure 15C:
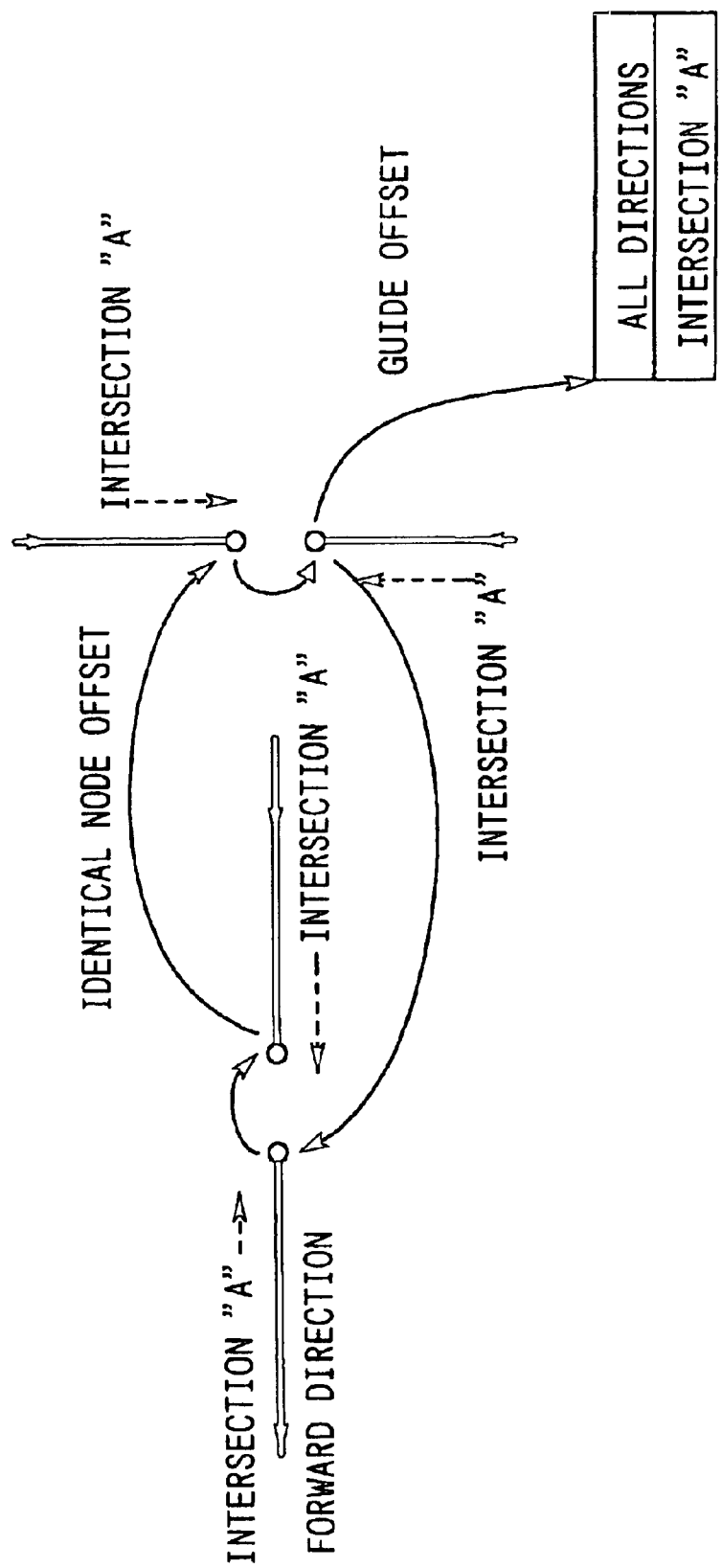
Figure 16A:
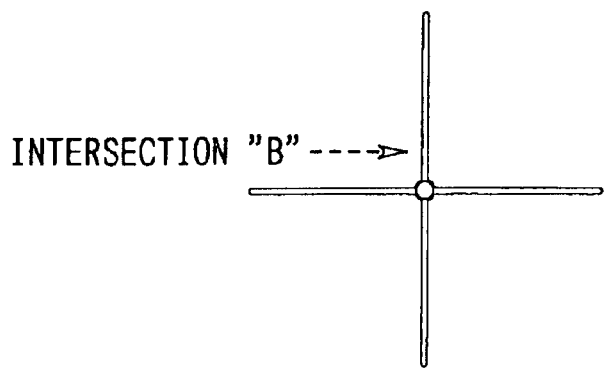
FIGS. 16A and 16B show a specific storage method for intersection name data.
Figure 16B:
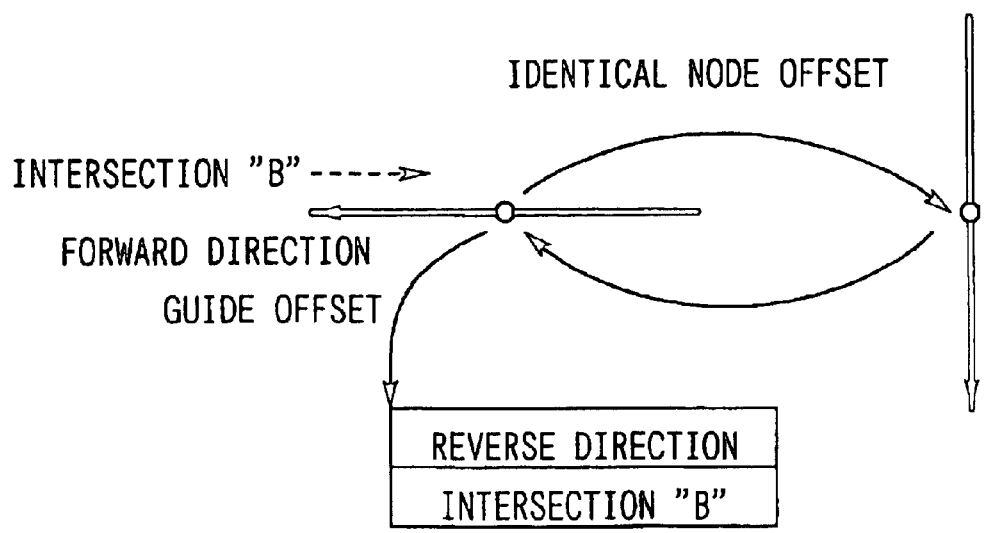
Figure 17A:
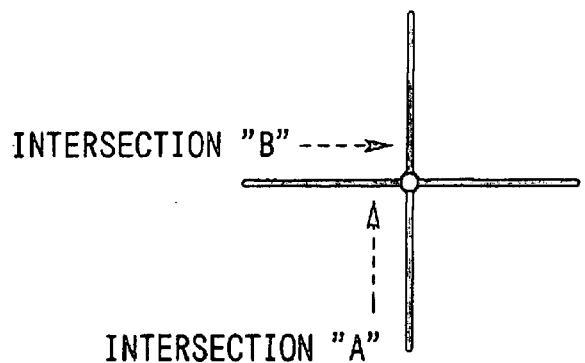
FIGS. 17A and 17B show a specific storage method for intersection name data.
Figure 17B:
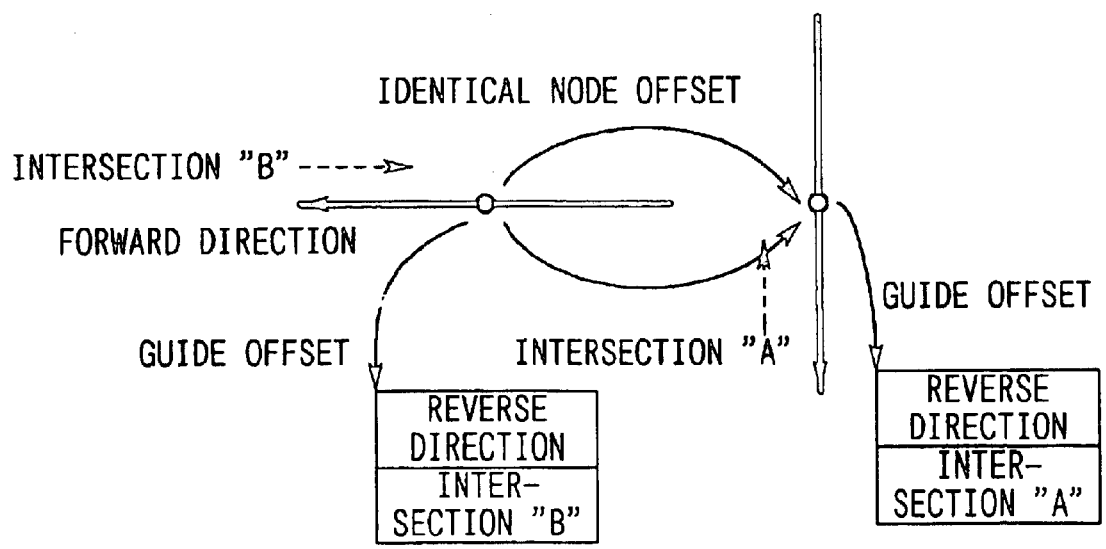

Next, in reference to FIGS. 12–16, specific storage methods for intersection name data are explained. In reference to the state at an intersection as illustrated in FIG. 12, FIG. 13A illustrates the data storage method employed when there are two link strings, FIG. 13B illustrates the data storage method employed when there are three link strings and FIG. 13C illustrates the data storage method employed when there are four link strings. In reference to the state at an intersection as illustrated in FIG. 14, FIG. 15A illustrates the data storage method employed when there are two link strings, FIG. 15B illustrates the data storage method employed when there are three link strings and FIG. 15C illustrates the data storage method employed when there are four link strings. In reference to the state at an intersection as illustrated in FIG. 16A, FIG. 16B illustrates the data storage method employed when there are two link strings. In reference to the state at an intersection as illustrated in FIG. 17A, FIG. 17B illustrates the data storage method employed when there are two link strings.

(2) Road Names

The following is an explanation of the road name data in the guide data. The one-word road name header illustrated in FIG. 18A is provided in the road name data in a manner similar to that in which the intersection name header is provided in the intersection data, and following the road name header, the road name offset is stored. The road name offset is an index for accessing a table of road name character strings, and since its concept is identical to that of the intersection name offset, its explanation is omitted. As shown in FIG. 18B, bits 12–13 of the road name header indicate the link direction and bits 0–7 indicate the number of characters in the character string indicating the road name to be referenced via the road name offset. The link directions include three directions, i.e., forward direction, reverse direction and bidirectional, to indicate the directions of roads assigned with road names by the direction in which the link string data are stored. While normally a road is assigned with one road name regardless of the direction of traffic on that road, there are some roads assigned with different road names depending upon the direction of traffic. In addition, only the road name data corresponding to the direction in which a link string connects to the node are required at the start point node or the end point node in the link string. Link directions are provided in the road name data in order to manage the data efficiently in such a case.

Figure 18C:
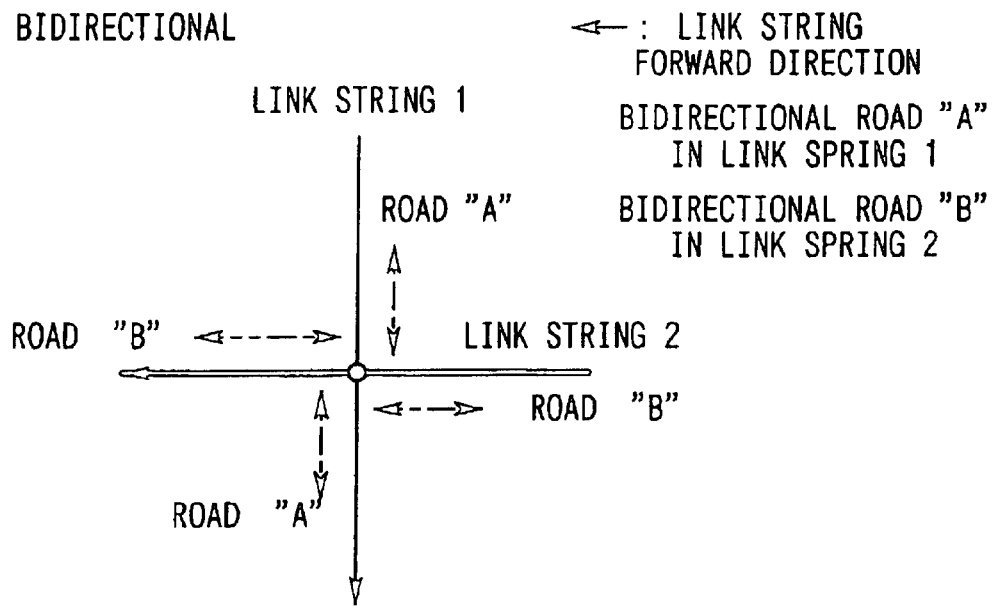
Figure 18D:
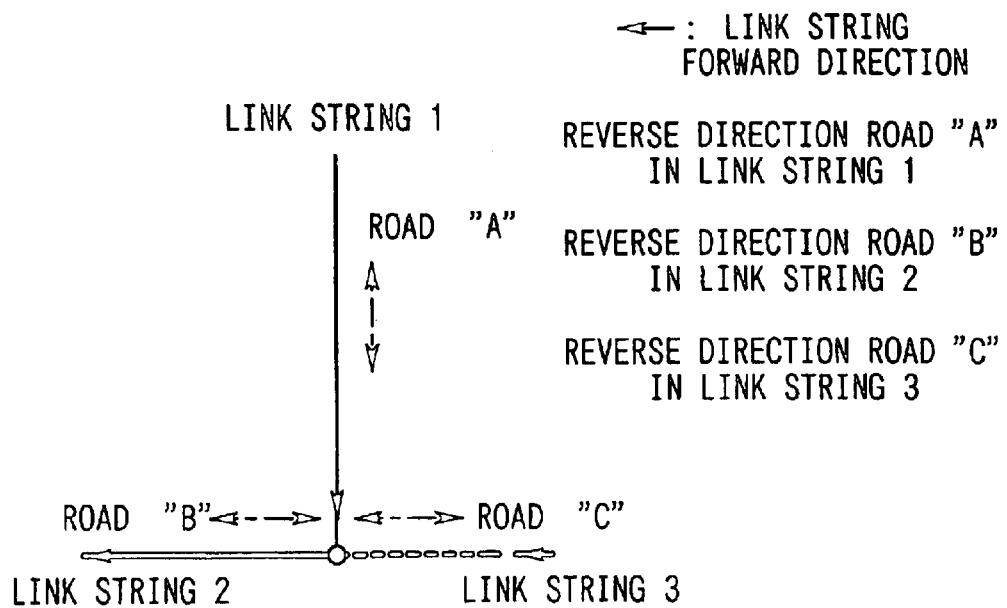

FIG. 18C and FIG. 18D illustrate the details of the above explanation. FIG. 18C illustrates a case in which the road corresponding to link string 1 is assigned with the road name "A" in both directions and the road corresponding to link string 2 is assigned with the road name "B" in both directions. In this case, the road name "A" data with the link direction set to "bidirectional" are set in the guide data at the node in link string 1, and the road name "B" data with the link direction set to "bidirectional" are set in the guide data at the node in link string 2.

In FIG. 18D, the node in link string 1 is an end point, the node in link string 2 is a start point and a node in link string 3 is an end point. In this case, the road corresponding to link string 1 is identified with the road name "A" in both directions, the road corresponding to link string 2 is identified with the road name "B" in both directions and the road corresponding to link string 3 is identified with the road name "C" in both directions. However, since the individual nodes each constitute either a start point or an end point in the respective link strings, the road name "A" with the link direction set to "reverse direction" is set in the guide data at the node in link string 1, the road name "B" with the link direction set to "forward direction" is set in the guide data at the node in link string 2 and the road name "C" with the link direction set to "reverse direction" is set in the guide data at the node in link string 3.

Figure 19A:
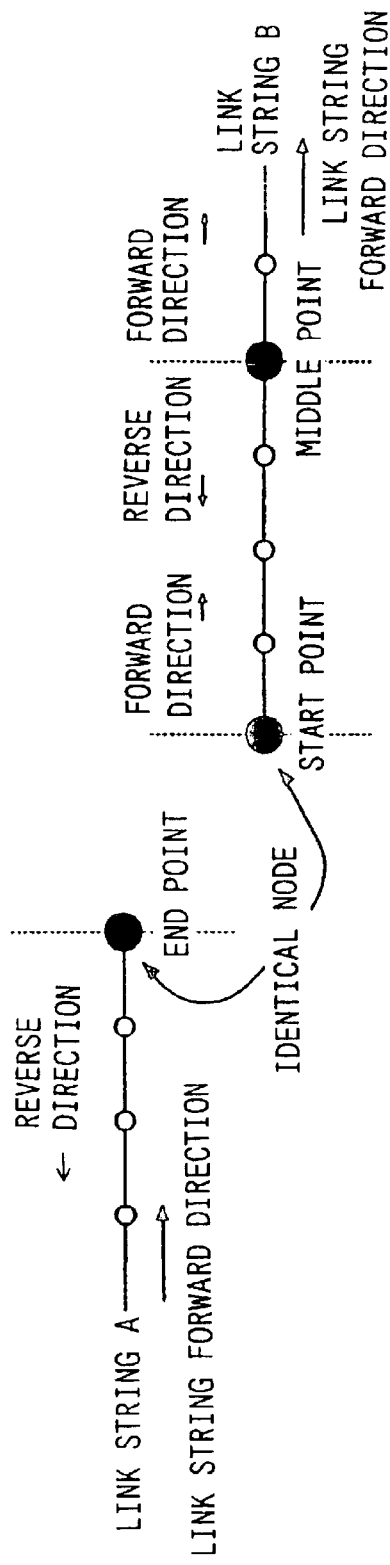
Figure 19B:
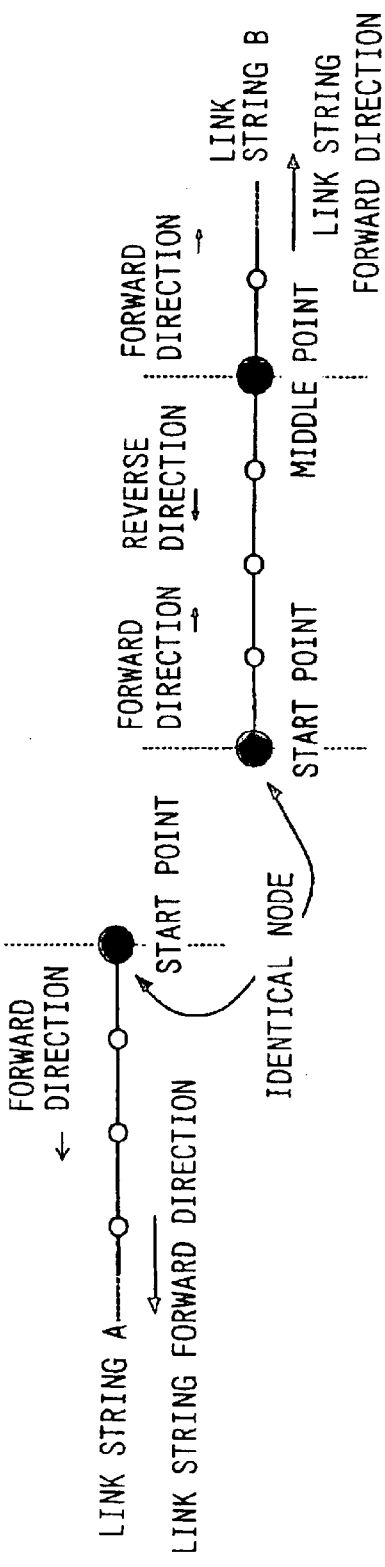
Figure 20A:
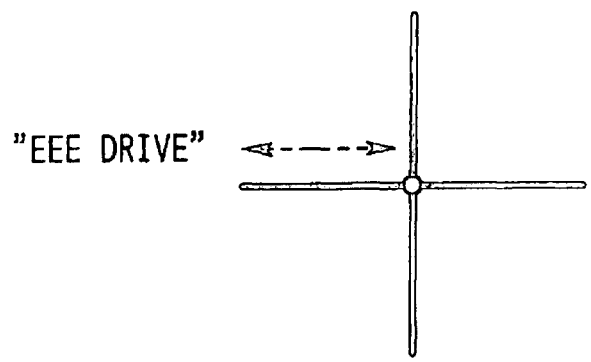
FIGS. 20A and 20B show a specific storage method for road name data.
Figure 20B:
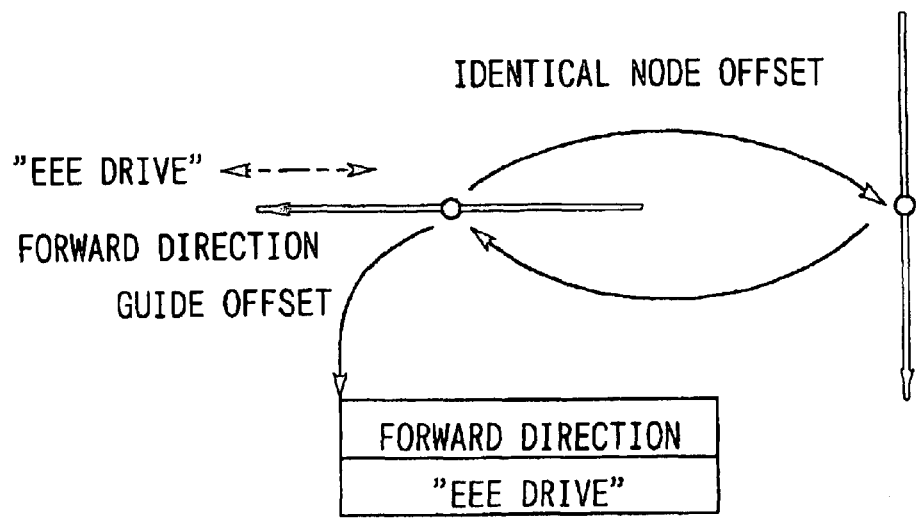
Figure 21A:
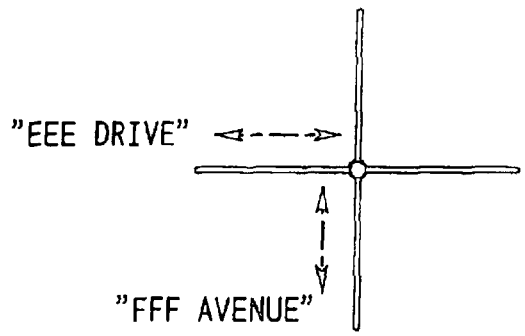
FIGS. 21A and 21B show a specific storage method for road name data.
Figure 21B:
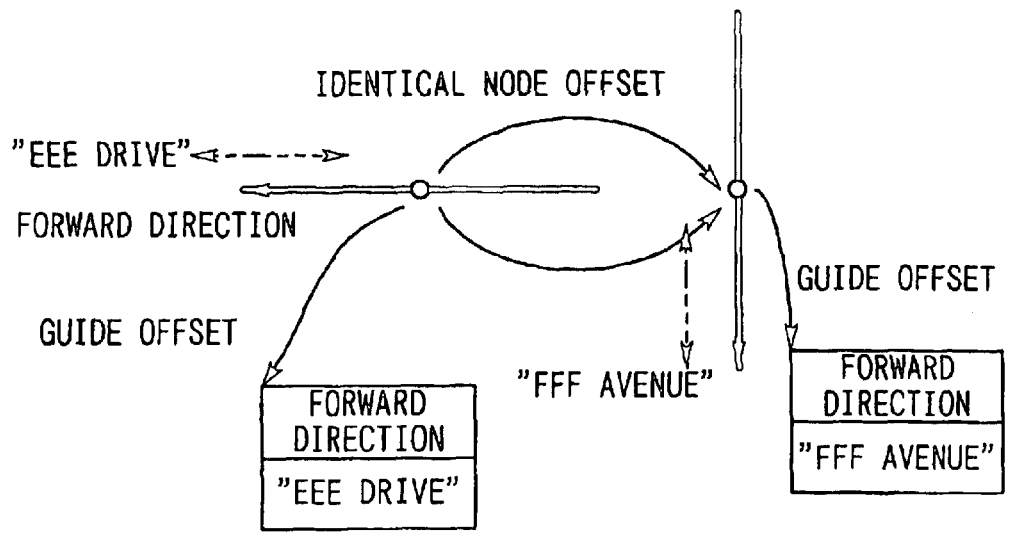

FIG. 19 illustrates setting of the road name data in the guide data at nodes at the start point, the end point and the middle point of a link string. Only the data in the forward direction are set at the start point node in the link string, only the data in the reverse direction are set at the end point node and data in both the forward direction and the reverse direction (bidirectional, if they are identical) are set at the middle point node. In other words, since only the information corresponding to the direction in which a road connects to an intersection is required as the road name information, only the information corresponding to the forward direction is required at the start point of a link string and only the information corresponding to the reverse direction is required at the end point.

Figure 22:
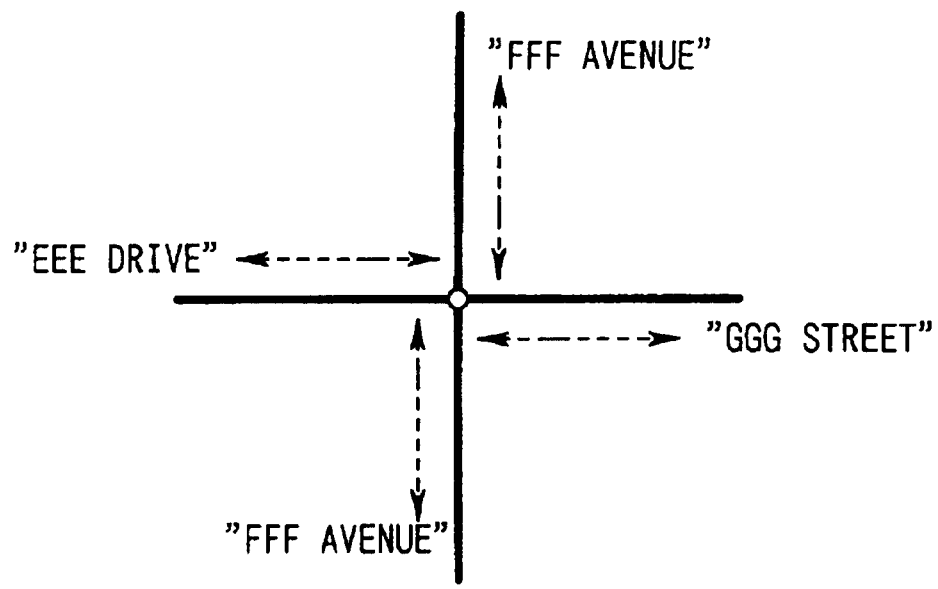
FIGS. 22 through 23C show specific storage methods for road name data.
Figure 23A:
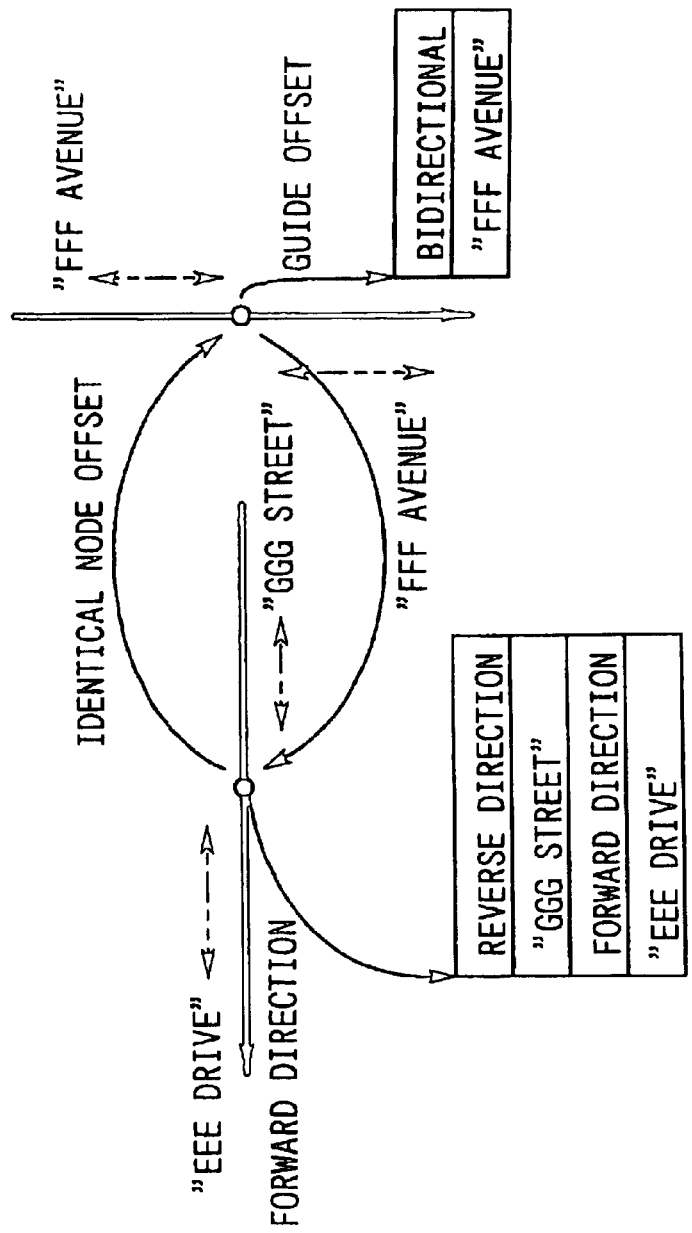
Figure 23B:
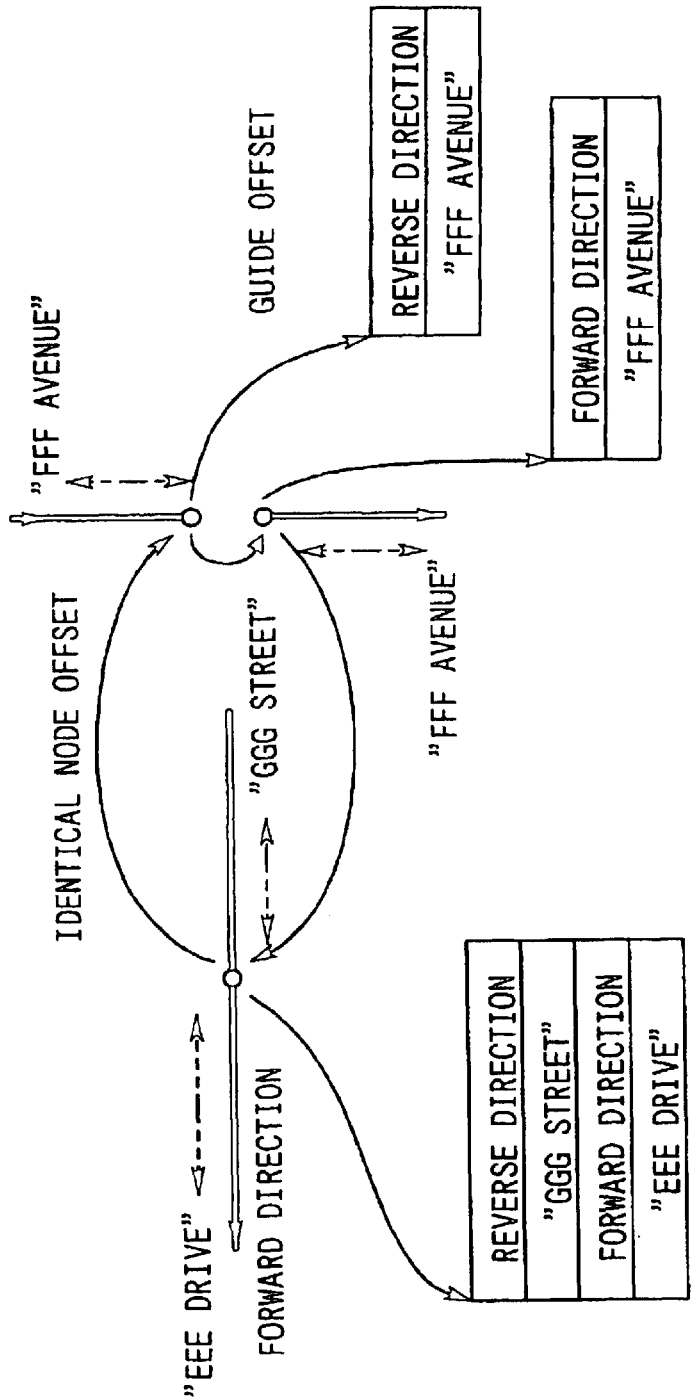
Figure 23C:
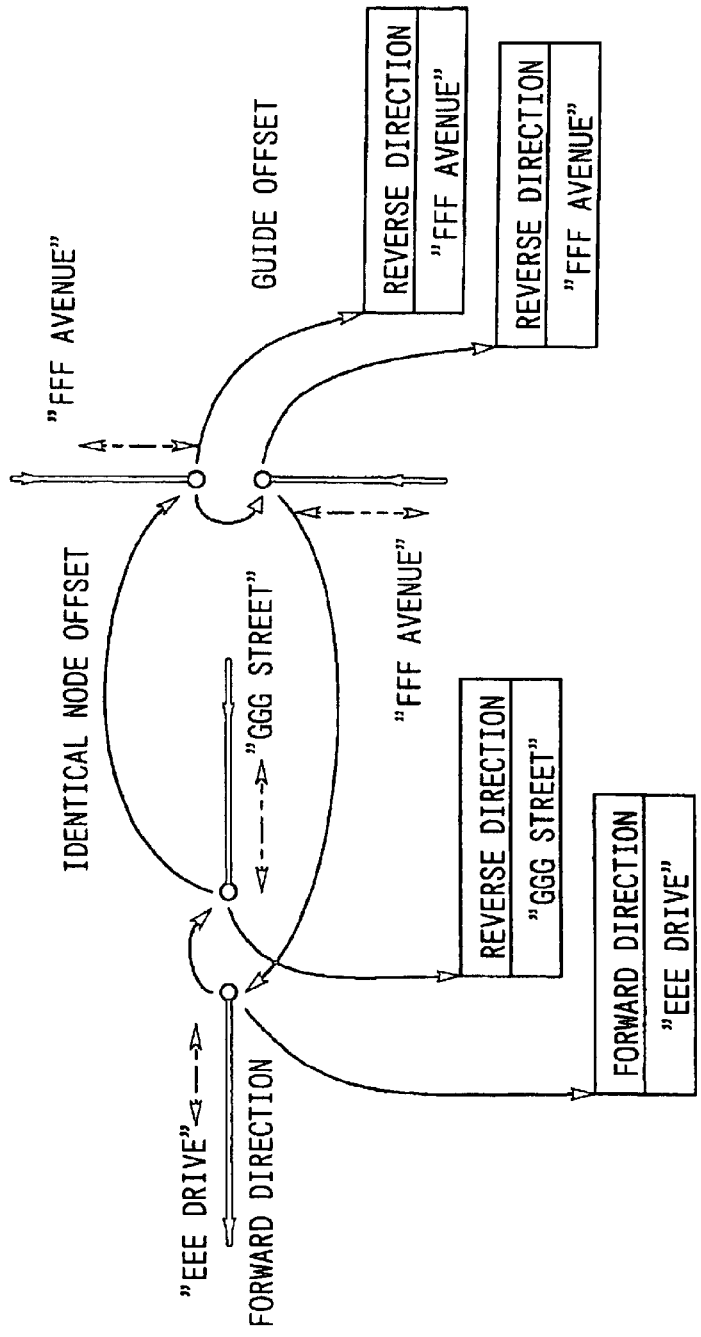

Next, FIGS. 20–23 illustrate specific storage methods for the road name data. In reference to the state at an intersection as illustrated in FIG. 20A, FIG. 20B illustrates the data storage method employed when there are two link strings. In reference to the state at an intersection as illustrated in FIG. 21A, FIG. 21B illustrates the data storage method employed when there are two link strings. In reference to the state at an intersection as illustrated in FIG. 22, FIG. 23A illustrates the data storage method employed when there are two link strings, FIG. 23B illustrates the data storage method employed when there are three link strings and FIG. 23C illustrates the data storage method employed when there are four link strings.

(3) Course Signs

Figure 24A:
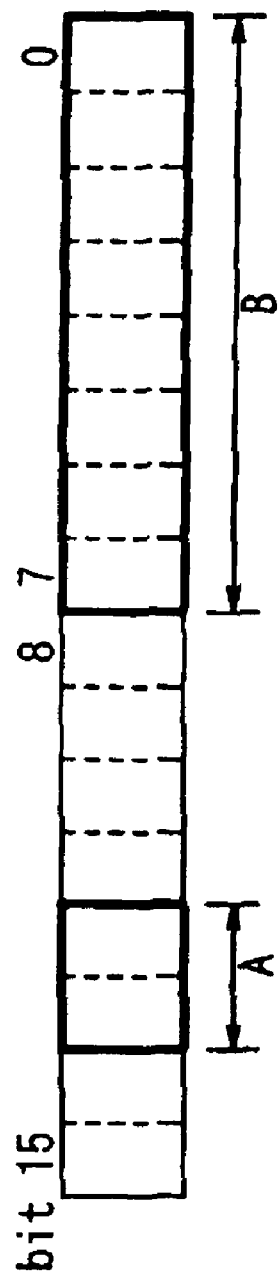

The following is an explanation of the course sign data in the guide data. The course signs are data that provide the course information corresponding to the forward direction of a link string and the course information corresponding to the reverse direction of the link string at a given node in the link string. The course sign may show name of place or the like toward which a road continue. A one-word course sign header illustrated in FIG. 24A is provided in the course sign data in the same manner as that in which the intersection name header is provided in the intersection name data, and following the course sign header, the course sign offset is stored, as shown in FIG. 8. The course sign offset is an index for accessing the table in which character strings indicating the individual course signs are stored, and since this concept is identical to that of the intersection name offset, its explanation is omitted. As shown in FIG. 24B, the bits 12–13 of the course sign header indicate link directions and the bits 0–7 indicate the number of characters in the character string indicating the course sign to be referenced via the course sign offset. The link directions include three directions, i.e., the forward direction, the reverse direction and bidirectional (no directionality), to indicate the directions of courses of roads assigned with course signs in correspondence to the direction in which the link string data are sequentially stored. Normally, the course signs are different in the advancing direction and its reverse direction on a given road.

FIG. 24C illustrates the details of the above explanation. On the road corresponding to link string 1, the forward direction is "toward A University" and on the road corresponding to link string 2, the reverse direction is "toward B University". Consequently, the course sign "toward A University" data with the link direction set to "forward direction" are set in the guide data at the node in link string 1, whereas the course sign "toward B University" with the link direction set to "reverse direction" are set in the guide data at the node in link string 2.

(4) Expansion Data (Landmarks)

The following is an explanation of the landmark data which are expansion data of the guide data. As explained earlier, landmarks in this context refer to noticeable structures such as buildings, i.e. gas stations and convenience stores and the like, and large billboards. In the landmark data, a one-word landmark header illustrated in FIG. 25A is provided at the front end of the data, and following the landmark header, the landmark (expansion) offset is stored, as shown in FIG. 8. The landmark offset is an index for accessing a table in which the character strings indicating the individual landmarks such as "ABC gas station", "XYZ convenience store" and the like are stored and since its concept is identical to that of the intersection name offset, its explanation is omitted. As shown in FIG. 25B, the bits 12–13 of the landmark header indicate the link direction and the bits 0–7 indicate the number of characters in the character string indicating the landmark to be referenced via the landmark offset. The link directions include four directions, i.e., all directions, forward direction, reverse direction and bidirectional. Normally, a landmark is sighted while advancing on a road or approaching an intersection, and a landmark building or the like can often be recognized regardless of the direction of approach. However, there may be cases in which a building can be sighted from one direction but cannot be sighted from the opposite direction since it is hidden by another building or the like. If the landmark information is uniformly provided to the driver or the like in such a case, it will confuse the driver since the information does not match what he is actually seeing. In order to deal with such a situation, the data in the link direction corresponding to the direction in which a landmark can be sighted are set to provide landmark information which reflects reality.

Figure 25C:
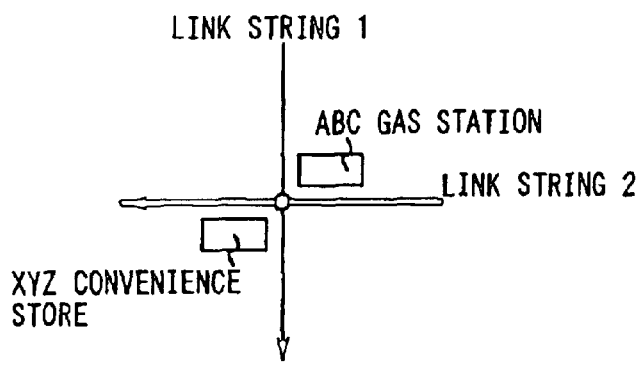
FIGS. 25A and 25D show the landmark header in guide data.
Figure 25D:
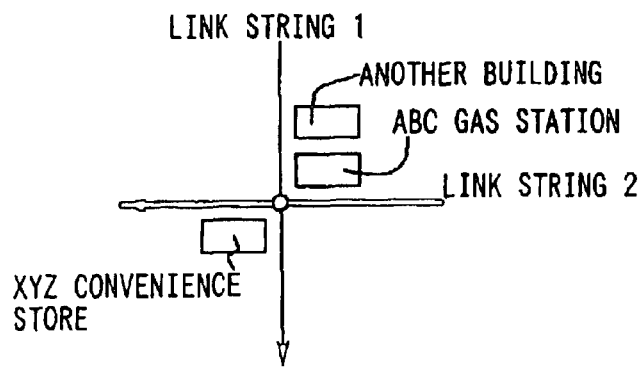

This point is explained in further detail in reference to FIGS. 25C and 25D. FIG. 25C illustrates a case in which landmarks "ABC gas station" and "XYZ convenience store" can be sighted regardless of which direction they are approached from in both link string 1 and link string 2. In this case, two sets of landmark data corresponding to the "ABC gas station" and the "XYZ convenience store" with the link direction set to "all directions" are set in the guide data at the node in either link string 1 or link string 2. The landmark data are set at the node in only one of the link strings, since the data only need to be set at either one of the nodes which are related to each other through the identical node offset, as in the case of the intersection name data illustrated in FIG. 11.

In FIG. 25D, in the forward direction, the ABC gas station cannot be sighted since it is hidden by another building and only the XYZ convenience store can be sighted in link string 1. Both can be sighted in the reverse direction. In link string 2, both landmarks can be sighted in both directions. As a result, the landmark "ABC gas station" with the link direction set to "reverse direction" and the landmark "XYZ convenience store" with the link direction set to "bidirectional" are set in the guide data at the node in link string 1. In the guide data at the node in link string 2, the landmark "ABC gas station" with the link direction set to "bidirectional" and the landmark "XYZ convenience store" with the link direction set to "bidirectional" are set.

It is to be noted that the coordination information indicating the position of a given landmark is added to the character string, and based upon this coordination information, the landmark is indicated at the position at which it is actually present on the map. In addition, the character string indicating the landmark may be replaced by data that visually indicate the landmark, such as an icon. This would make it possible to identify the landmark at a glance on the display device.

[3] Route Search Data

The route search data include a plurality of sets of data corresponding to a plurality of sets of roadmap display data for different scales, and the data for each scale are referred to as level m (m, may be, for instance, 2, 4) data.

Figure 26:
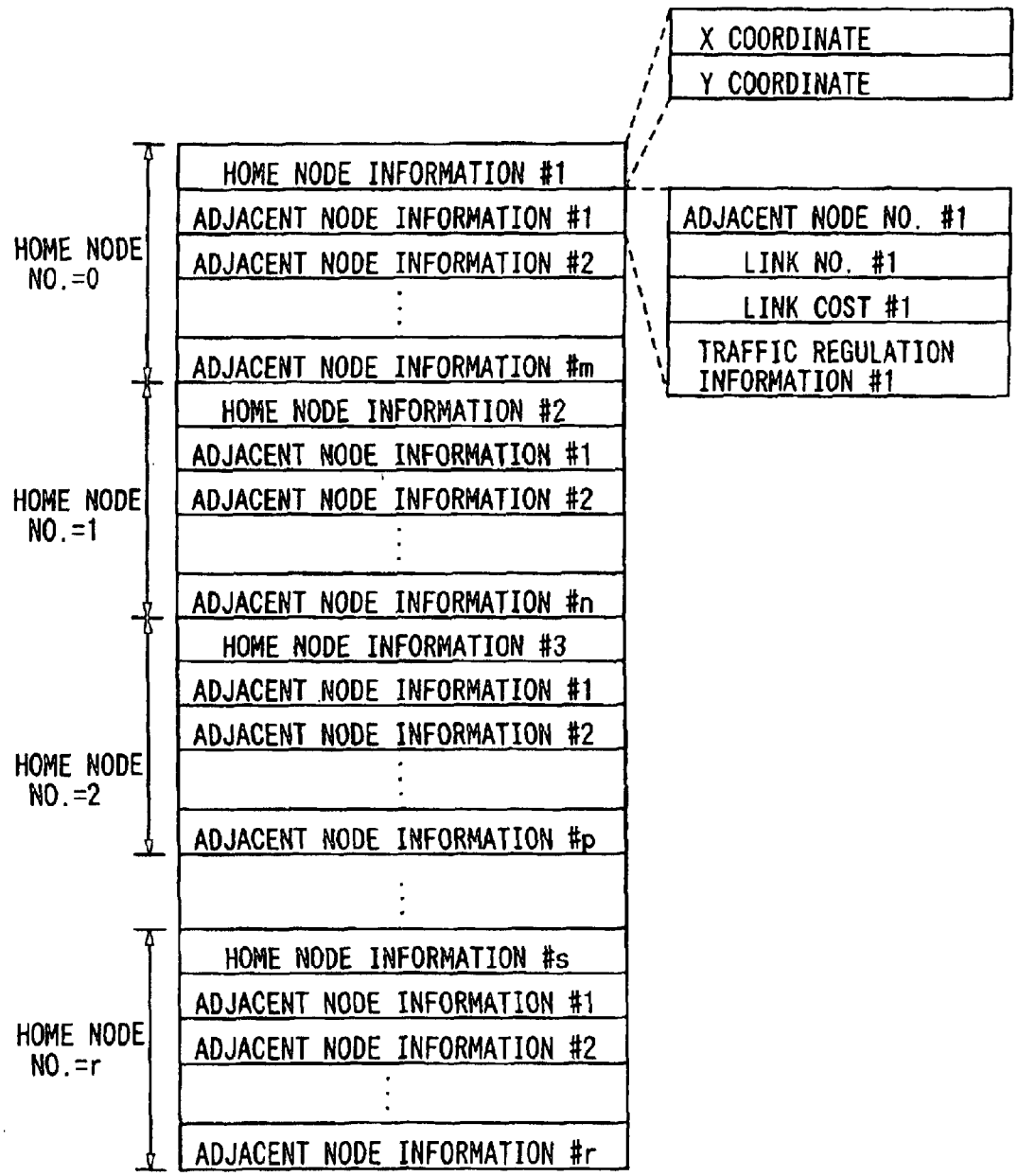
FIG. 26 shows the structure of route search data.

FIG. 26 shows the data structure of route search data. As shown in the figure, in the route search data, node information that indicates the connecting relationship with other nodes is stored for each connecting point (node) of links, which are the minimum units for expressing a road physical form. Each set of node information is constituted with home node information and adjacent node information, with the node positional coordinates stored in the home node information. In the adjacent node information, as shown in the figure, the adjacent node no., the link no. from the home node to the adjacent node, the link cost of the link and traffic regulation information on that link are stored. Also, various sets of node information are stored in the order of link connections and the node no. of the home node can be ascertained by the order in which it is stored. Because of this, even without storing the node nos. of the home nodes as home node information, the node nos. of the home nodes can be ascertained, achieving a reduction in memory requirement.

[4] Recommended Route Data

Figure 27:
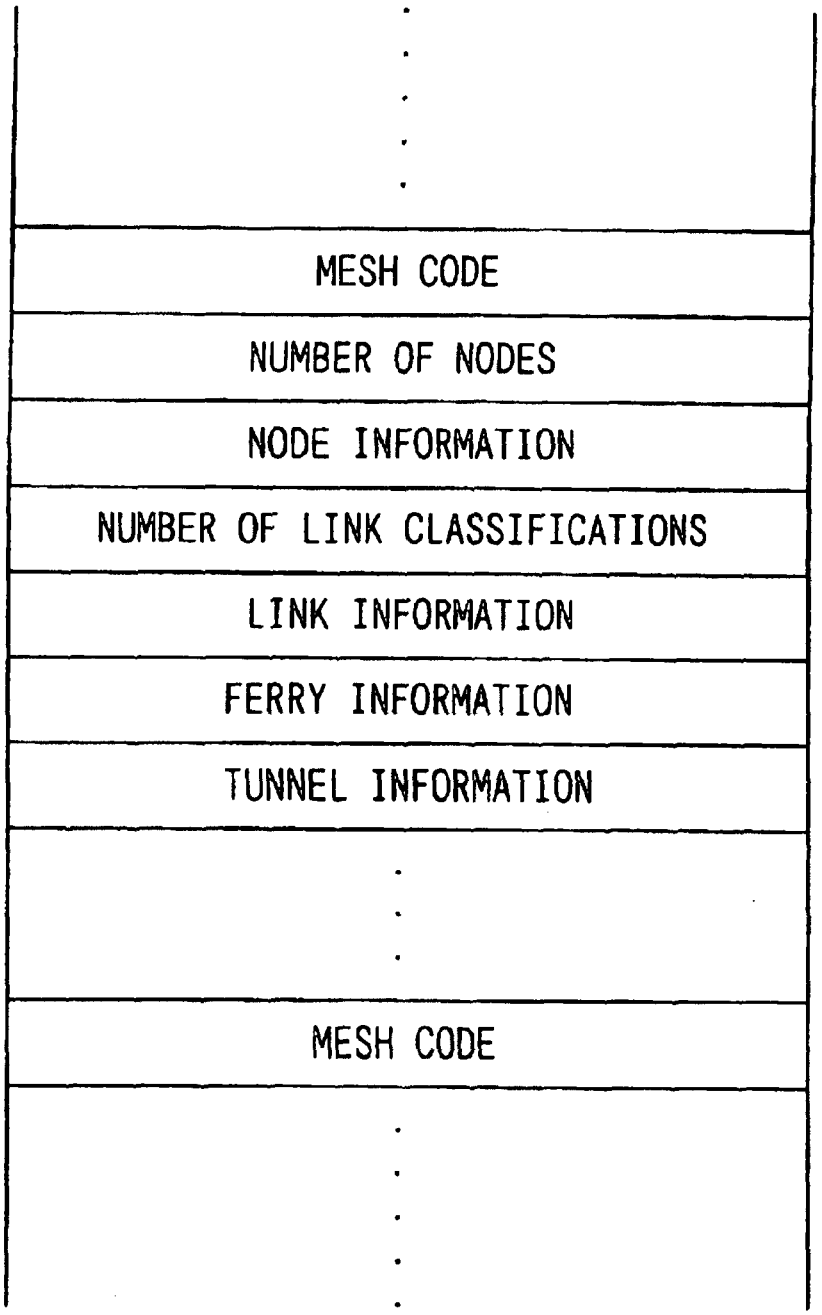
FIG. 27 shows an overview of the structure in the recommended route data.

FIG. 27 shows an outline of the data structure of recommended route data which represent a recommended route from a point of departure to a destination which has been searched based upon the route search data. In the recommended route data, node information and link information on the recommended route are stored, while classified in units of mesh ranges. It is to be noted that a mesh range refers to a partitioned range when a roadmap is partitioned into units of specific ranges.

Figures 28A, 28B:
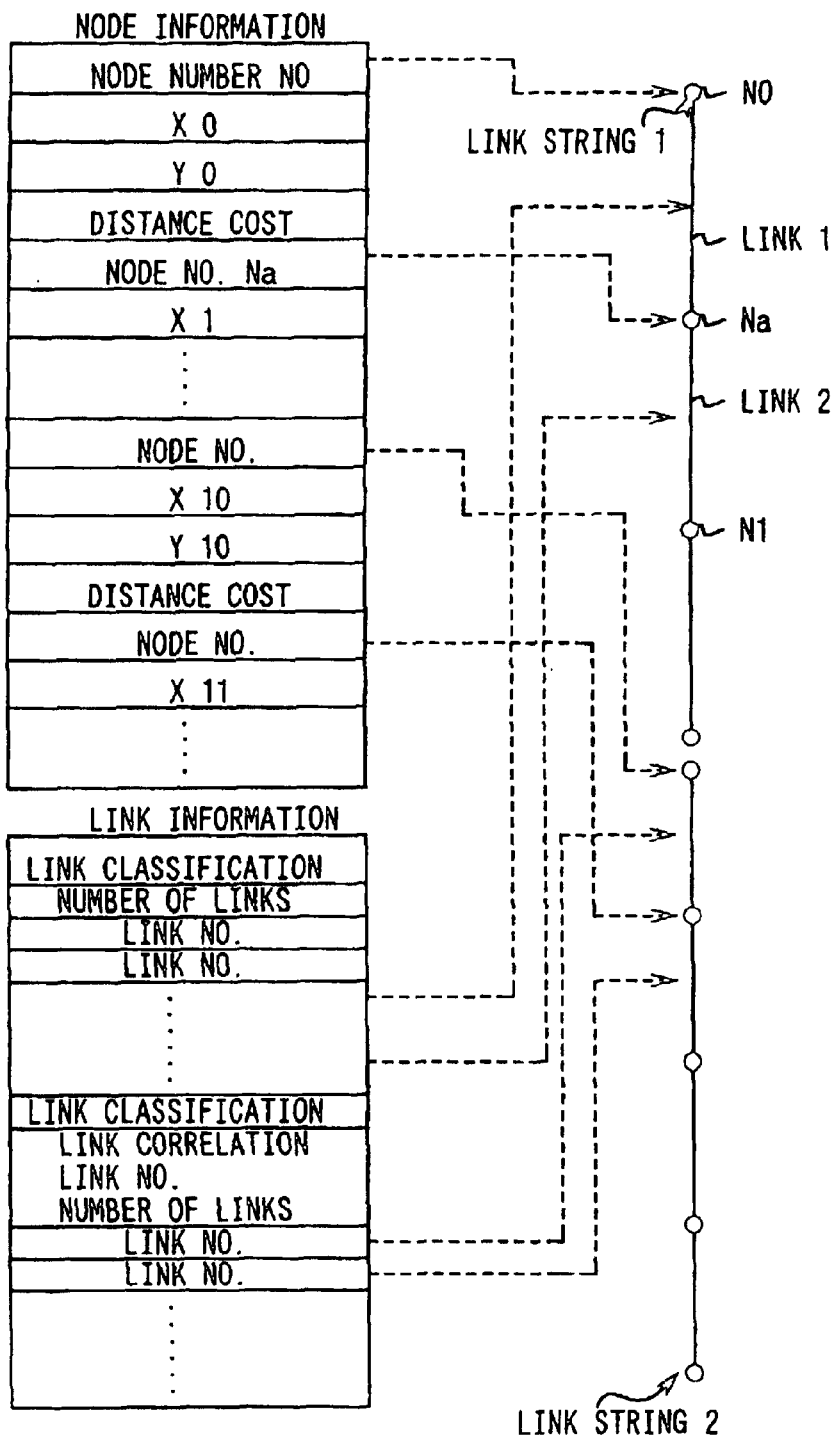
FIGS. 28A and 28B show detailed diagrams illustrating the data structure of the node information and the link information in the recommended route data.

As shown in FIG. 27, the recommended route data are constituted with a mesh code, the number of nodes, node information, the number of link classifications, link information, ferry information and tunnel information. The number for identifying the mesh range is stored in the storage area for the mesh code, the number of nodes present within a mesh range is stored in the storage area for the number of nodes and, as shown in detail in FIG. 15A, the node no., the positional coordinates, the distance cost and the like of each node within a mesh range are stored in the storage area for the node information. In addition, the number of link classifications that are present inside a mesh range is stored in the storage area for the number of link classifications and, as shown in detail in FIG. 28B, the link classification, the number of links, the link no. and the like of each link within a mesh range are stored in the storage area for the link information. FIGS. 28A and 28B illustrate a case in which two link strings 1 and 2 from among a plurality of link strings within the area indicated by the same mesh code.

It is to be noted that, as explained above, recommended route data are prepared at different levels and, in this embodiment, recommended route data at level 2 are prepared for the vicinities of the start point and the end point on the recommended route while recommended route data at level 4 are prepared for the middle range between the start point and the end point.

The following is an explanation of the operation performed in this embodiment in reference to the flowchart, and in this embodiment, the recommended route is displayed on the display device 6 in the following manner. The recommended route is searched by using the route search data at level 4 and level 2 to create recommended route data at level 4 and level 2, and then, the recommended route data at level 4 is converted into recommended route data at level 2, and then based upon the recommended route data at level 2 and the roadmap display data at level 2 and level 1, the recommended route is drawn and superimposed upon the roadmap at level 2 or level 1, which is displayed on the display device 6, with the recommended route highlighted with a red bold line, for instance.

Figure 29:
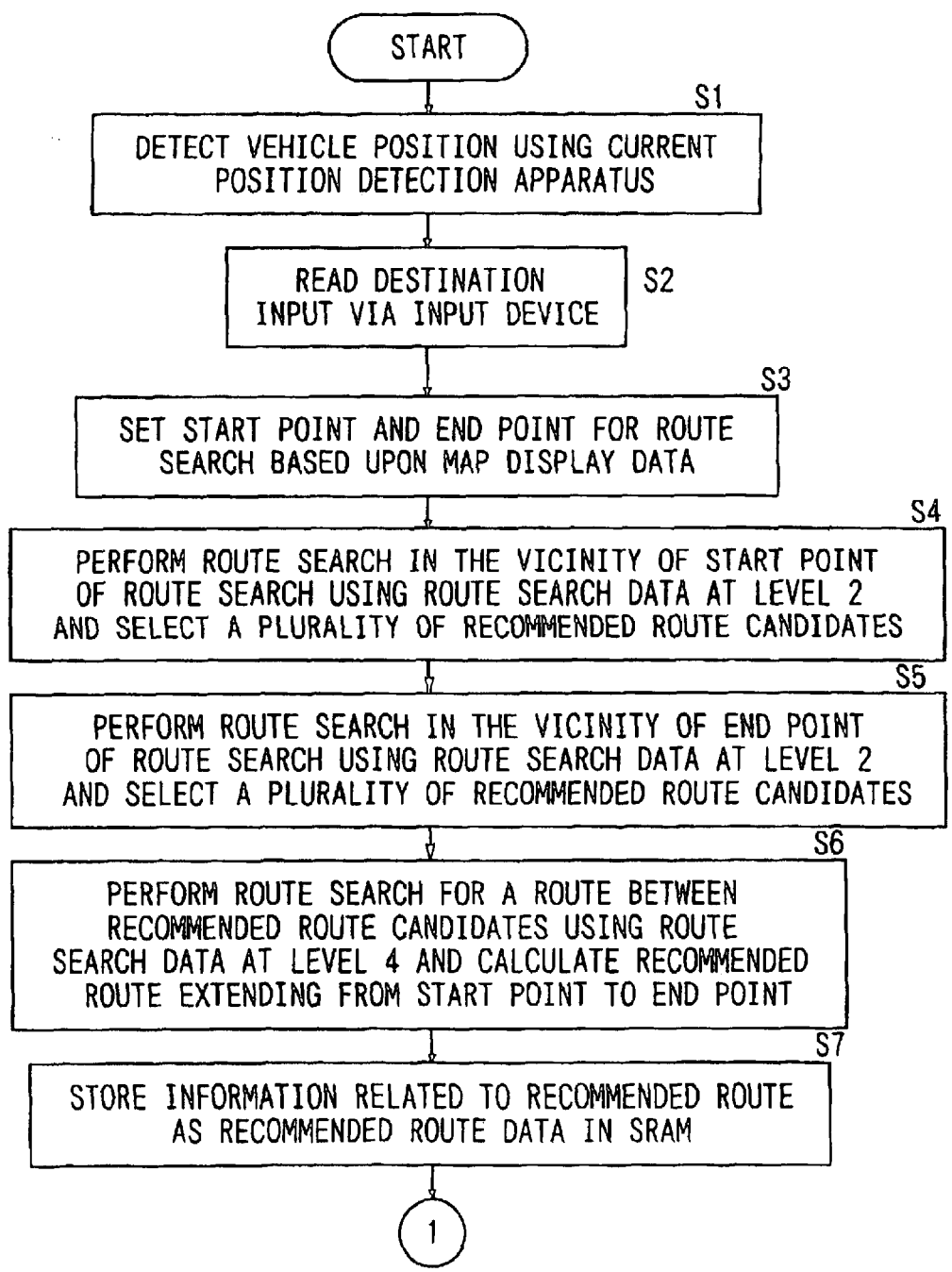
FIG. 29 shows a flowchart outlining the main processing performed by the control circuit.
Figure 30:
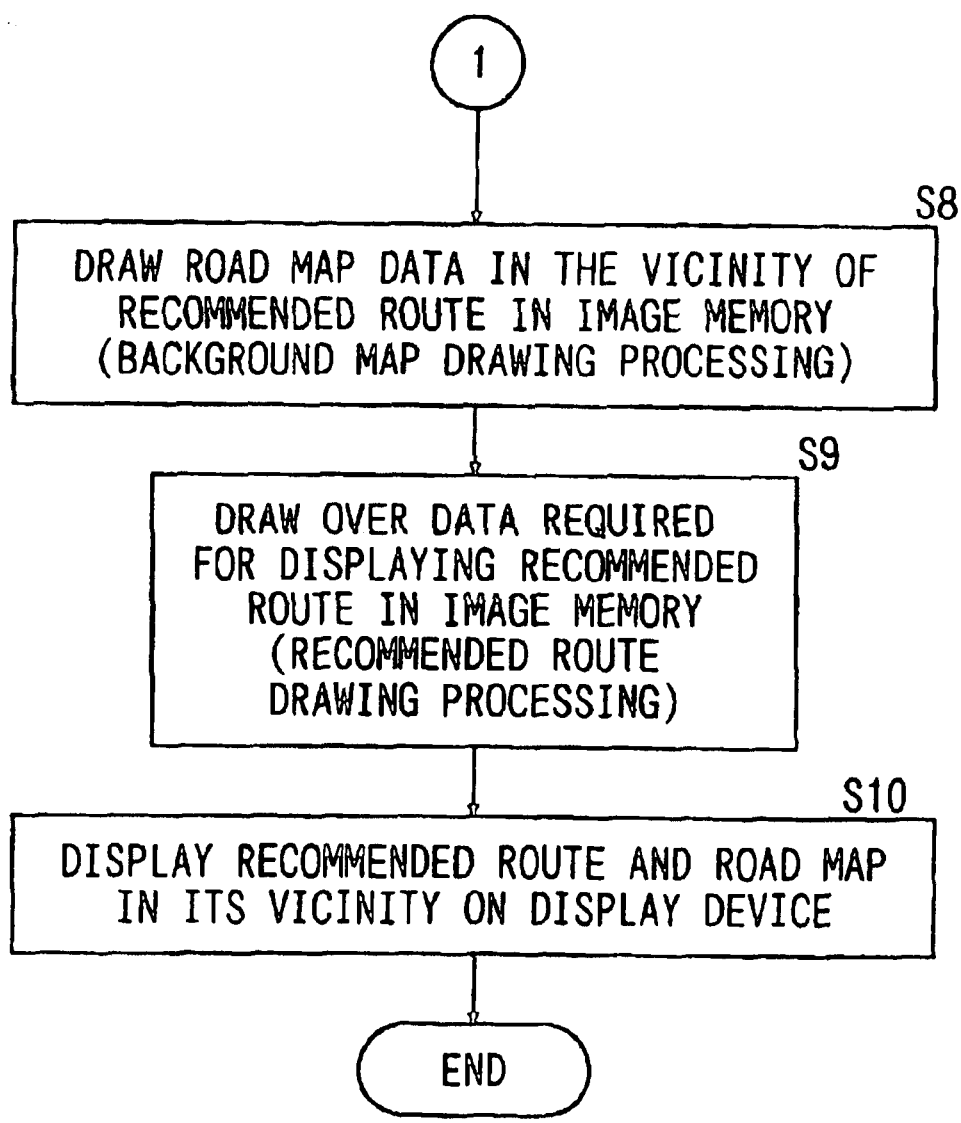
FIG. 30 shows the flowchart continuing from FIG. 29.

FIGS. 29 and 30 present a flowchart schematically illustrating the processing in which the control circuit 2 performs route search and the results are displayed. In step S1 in FIG. 29, the vehicle position is detected by the current position detection apparatus 1. In step S2, the destination, which has been input via the input device 3, is read in. In step S3, based upon the map display data stored in the map database apparatus 8, the start point and the end point of the route search are set on roads for which route search is possible. For instance, the start point of a vehicle may be the current position of the vehicle (vehicle position) and the end point is the destination.

In step S4, using route search data at level 2, route search in the vicinity of the start point of the route search is performed, and a plurality of candidates for the recommended route in the vicinity of the start point are selected. In step S5, using route search data at level 2, route search in the vicinity of the end point of the route search is performed, and a plurality of candidates for the recommended route in the vicinity of the end point are selected.

In step S6, using route search data at level 4, route search is performed for routes between the candidates for the recommended routes selected in step S4 and step S5, and a recommended route from the start point to the end point is calculated.

Route search data at different levels are used for the vicinities of the start point and the end point, and the middle range between the start point and the end point in this manner because if route search is performed using route search data at level 2 for the entire route, the data quantity will be very large and, as a result, the calculation time required in route search will increase. In step S7, the information related to the recommended route calculated in step S6 is stored in the SRAM 7 as recommended route data.

When the processing performed in step S7 in FIG. 29 is completed, the operation proceeds to step S8 shown in FIG. 30, in which the background map drawing processing is performed to draw (store) data related to the roadmap in the vicinity of the recommended route in the image memory 5 for display on the display device 6. When the processing performed in step S5 is completed, the operation proceeds to step S9 in which the data required to display the recommended route calculated in step S6 are also drawn over (stored) in the image memory 5. In step S10, the data stored in the image memory 5 are read out and the recommended route and the roadmap in the vicinity are displayed on the display device 6.

Figure 31:
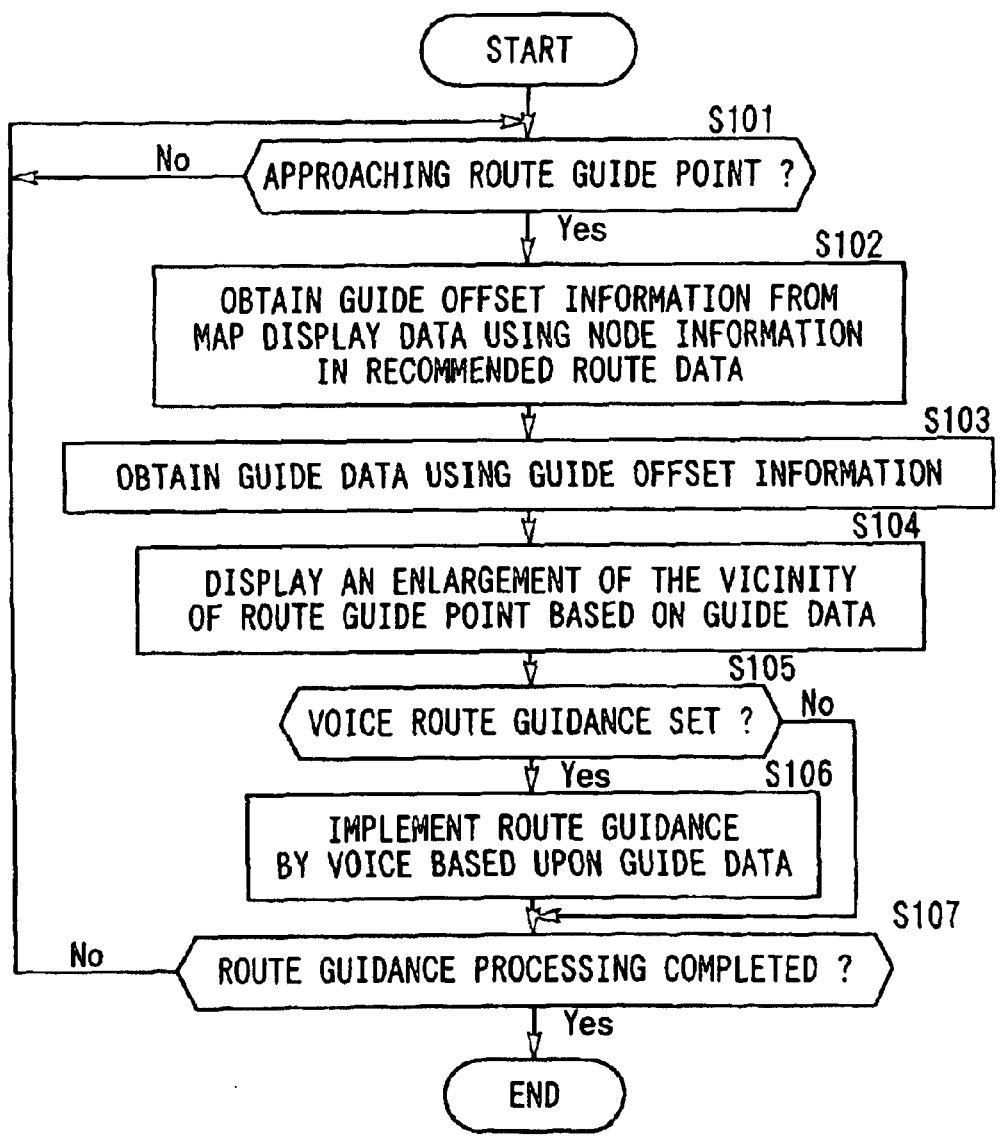
FIG. 31 shows a flowchart schematically illustrating the route guidance processing performed by the control circuit.

FIG. 31 presents a flowchart schematically illustrating the processing in which guidance is implemented based upon the data on the recommended route that has been searched as described above. When an instruction for route guidance processing start is issued by the operator, the processing illustrated in FIG. 31 starts. In step S101, the current position is verified by the current position detection device 1, and a decision is made based upon the map display data and the recommended route data as to whether or not the vehicle has entered the vicinity of a route guide point. The route guide point refers to a point, i.e., a node, at which route guidance is to be implemented on the recommended route, and route guide points are set through the program in conformance to specific conditions. Alternatively, they may be set freely by the operator. If it is decided in step S101 that the vehicle has entered the vicinity of a route guide point, the operation proceeds to step S102, whereas if it is decided in step S101 that it has not entered the vicinity of a route guide point, the operation loops at step S101. In step S102, the node information corresponding to the route guide point is taken from the recommended route data, and using the node information, the map display data corresponding to the relevant node are accessed to obtain the guide offset information explained earlier. In step S103, using the guide offset information obtained in step S102, the guide data are accessed to obtain the guide data corresponding to the relevant node. In step S104, based upon the obtained guide data, the vicinity of the route guide point is displayed in an enlargement. In step S105, a decision is made as to whether or not voice route guidance has been selected, and if it has been selected, the operation proceeds to step S106 to implement route guidance by voice based upon the guide data. In steps S104 and S106, specific processing is performed by taking into consideration the link direction and the like in the guide data as explained before. If the voice route guidance is not set, the operation skips step S106 and proceeds to step S107. In step S107, a decision is made as to whether or not the route guidance processing has been completed, and if it has not yet been completed, the operation returns to step S101 to repeat the processing. If, on the other hand, the route guidance processing has been completed, i.e., if the route guidance leading to the destination has been completed, the processing ends.

It is to be noted that in the explanation given above in reference to the flowchart, a guide offset is obtained every time the vicinity of a route guide point is entered to obtain the guide data and, based upon the guide data, the guidance processing is implemented. However, all the guide data may be obtained together in advance using the recommended route data to prepare a series of data related to guidance in advance. In addition, even when the recommended route data have been searched and prepared as level 4 wide range data, the guide data may be processed at the most detailed data level. In other words, when guidance is implemented through a route over the level 4 wide range, the guidance may be implemented by referencing the data at the most detailed level at all times, even at nodes that are not displayed in the level 4 wide range data, obtaining the guide data at those nodes. By doing so, guidance will be implemented at the most detailed map level at all times at the guide points. Furthermore, the road form and the like may be calculated based upon the map display data and the like at a guide point to implement guidance to issue instructions such as, for instance, "turn right 45 degrees".

The medium used in the map database apparatus does not have to be limited to the CD ROM or the floppy disk mentioned earlier. A magnetic tape, magneto-optical disk or a memory card may be used, or the storage area inside the navigation system may be utilized. In other words, any medium may be employed as long as it is capable of storing the guide data according to the present invention.

In the above embodiment, the navigation system for vehicles that is shown in FIG. 1 was explained. However, the construction of the navigation system does not have to be limited to FIG. 1. As shown in FIG. 32, a computer 101 such as a personal computer can establish a system which is equal to the navigation system shown in FIG. 1, by reading in a control program from a recording media 102 in which the control program is stored and executing the control program in the computer 101. In this case, the map database explained in the above embodiment is also read in from a recording media 103. Furthermore, apparatuses which are needed for the navigation system, such as a current position detection apparatus and the like, are connected to I/O ports of the computer 101.

What is claimed is:

1. A map database apparatus that manages roads by expressing said roads as link strings, each of said link strings being constituted by connecting a plurality of links, each of said links having nodes at a front end and a rear end respectively, said map database apparatus having node information regarding each of said nodes, said node information including guide data to be used for route guidance, wherein:

at an intersection of said link strings, when said guide data in said node information at each of said nodes in said link strings corresponding to said intersection are common to each other, said guide are provided only for one of said nodes in said link strings corresponding to said intersection without being provided for the rest of said nodes in said link strings corresponding to said intersection.

2. A map database apparatus according to claim 1, wherein:

said node information at said nodes in said link strings corresponding to said intersection includes information indicating that said nodes are related to each other.

* * * * *